(12) United States Patent
He et al.

(10) Patent No.: US 11,506,610 B2
(45) Date of Patent: Nov. 22, 2022

(54) DUAL FUNCTIONAL SUBSTRATES AND METHODS OF MAKING THE SAME

(71) Applicant: University of Massachusetts, Boston, MA (US)

(72) Inventors: Lili He, Belchertown, MA (US); Chen Tan, Ithaca, NY (US)

(73) Assignee: University of Massachusetts, Boston, MA (US)

( * ) Notice: Subject to any disclaimer, the term of this patent is extended or adjusted under 35 U.S.C. 154(b) by 232 days.

(21) Appl. No.: 15/971,168

(22) Filed: May 4, 2018

(65) Prior Publication Data

US 2018/0321156 A1 Nov. 8, 2018

Related U.S. Application Data

(60) Provisional application No. 62/502,069, filed on May 5, 2017.

(51) Int. Cl.
| | |
|---|---|
| *G01N 21/65* | (2006.01) |
| *C08J 7/06* | (2006.01) |
| *C09D 1/00* | (2006.01) |
| *C09D 5/24* | (2006.01) |
| *G01N 21/3577* | (2014.01) |

(52) U.S. Cl.
CPC .............. *G01N 21/658* (2013.01); *C08J 7/06* (2013.01); *C09D 1/00* (2013.01); *C09D 5/24* (2013.01); *G01N 21/3577* (2013.01); *C08J 2327/16* (2013.01)

(58) Field of Classification Search
CPC ..... G01N 21/658; G01N 21/3577; C08J 7/06; C08J 2327/16; C09D 1/00; C09D 5/24
See application file for complete search history.

(56) References Cited

U.S. PATENT DOCUMENTS

| 9,174,173 B2 * | 11/2015 | Bhattacharyya ... B01D 67/0079 |
| 2003/0059820 A1 * | 3/2003 | Vo-Dinh .............. C12Q 1/6837 506/3 |
| 2007/0048180 A1 * | 3/2007 | Gabriel .................. B82Y 15/00 422/400 |

(Continued)

OTHER PUBLICATIONS

Le, Fei, et al., "Metallic Nanoparticle Arrays: A Common Substrate for Both Surface-Enhanced Raman Scattering and Surface-Enhanced Infrared Absorption", ACS NANO vol. 2 ? No. 4, (2008), 707-718.

(Continued)

*Primary Examiner* — Brian J. Sines
(74) *Attorney, Agent, or Firm* — Schwegman Lundberg & Woessner, P.A.

(57) ABSTRACT

Various embodiments disclosed relate to a substrate. The present disclosure provides a substrate for use in both surface enhanced Raman spectroscopy and surface enhanced infrared spectroscopy. The substrate includes a flexible polymeric membrane, a plurality of metal oxide nanoparticles disposed on the polymeric membrane, and a plurality of metallic nanoparticles directly disposed on a portion of the plurality of metal oxide nanoparticles. The plurality of metal oxide nanoparticles are configured to work synergistically with metal nanoparticles upon exposure of the substrate surface to at least one of visible light or infrared radiation.

14 Claims, 7 Drawing Sheets

(56) References Cited

U.S. PATENT DOCUMENTS

| | | | | |
|---|---|---|---|---|
| 2008/0096005 A1* | 4/2008 | Premasiri | B82Y 15/00 | 428/323 |
| 2008/0241828 A1* | 10/2008 | Wu | C12Q 1/6827 | 435/6.14 |
| 2009/0130778 A1* | 5/2009 | Kalgutkar | C23C 14/0005 | 436/526 |
| 2010/0021023 A1* | 1/2010 | Lewis | G01N 21/658 | 382/124 |
| 2011/0217544 A1* | 9/2011 | Young | B29C 37/0032 | 428/327 |
| 2012/0062885 A1* | 3/2012 | Lin | G01N 1/00 | 356/301 |
| 2012/0208174 A1* | 8/2012 | Galush | G01N 33/54346 | 435/5 |
| 2013/0066223 A1* | 3/2013 | Beck | G01N 33/497 | 600/532 |
| 2013/0107254 A1* | 5/2013 | Yu | G01J 3/44 | 356/301 |
| 2014/0081150 A1* | 3/2014 | Chu | A61B 5/0075 | 600/478 |
| 2014/0106469 A1* | 4/2014 | Wu | G01N 33/54346 | 436/501 |
| 2016/0161413 A1* | 6/2016 | Ing | G01N 21/94 | 506/6 |
| 2016/0202222 A1* | 7/2016 | Roberts | G01N 1/2202 | 435/5 |
| 2016/0349172 A1* | 12/2016 | Houghton | G01N 33/227 | |
| 2016/0356721 A1* | 12/2016 | He | C12Q 1/06 | |
| 2017/0052123 A1* | 2/2017 | He | G01N 1/4055 | |
| 2017/0354950 A1* | 12/2017 | Hasegawa | B01J 20/06 | |
| 2019/0376962 A1* | 12/2019 | Vats | B82Y 15/00 | |

OTHER PUBLICATIONS

Patra, Kshirodra K., et al., "Bimetallic and Plasmonic Ag—Au on TiO2 for Solar Water Splitting: An Active Nanocomposite for Entire Visible—Light-Region Absorption", ChemCatChem 2016, 8,, (2016), 3294-3301.

\* cited by examiner

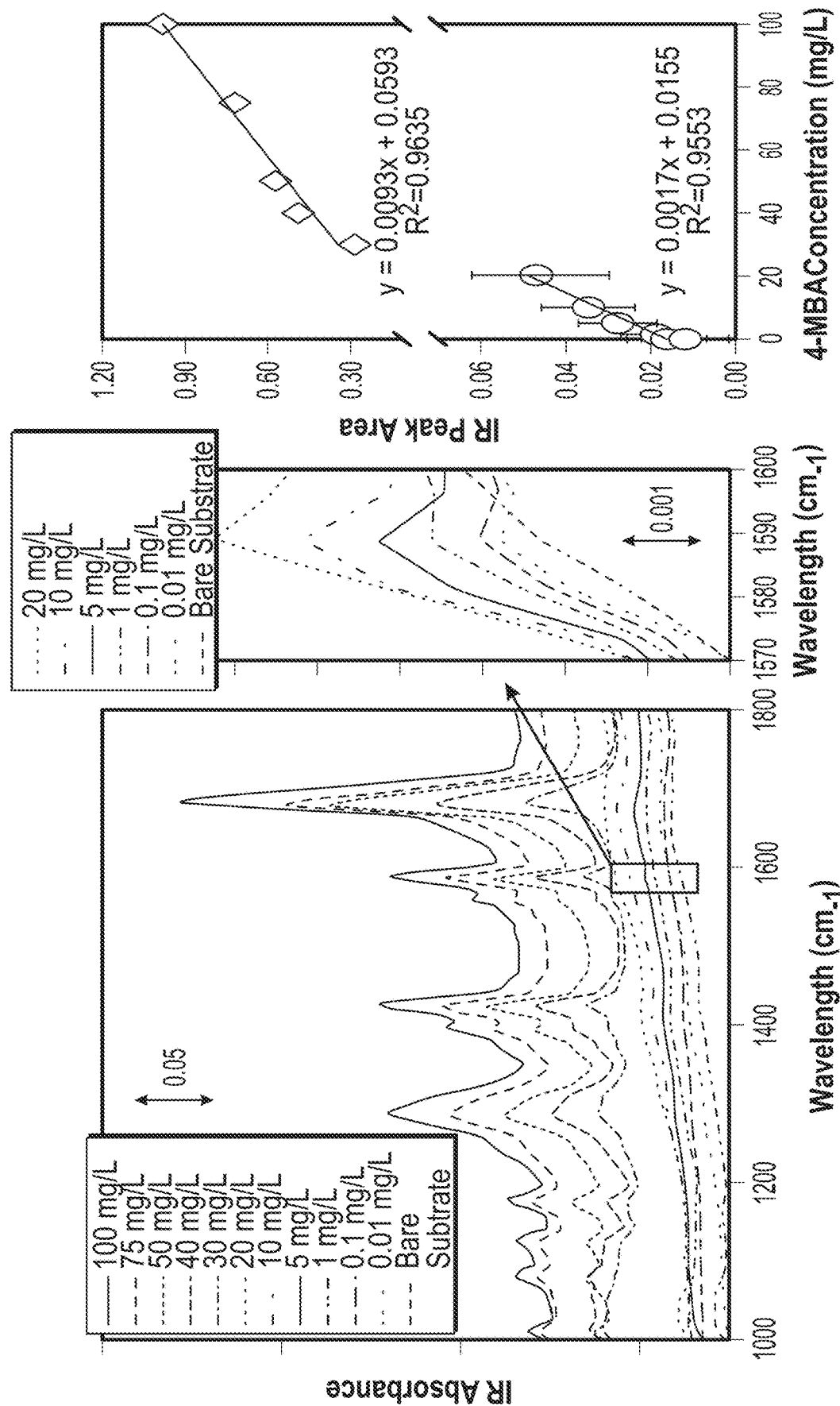

DUAL FUNCTIONAL SUBSTRATES AND METHODS OF MAKING THE SAME

CROSS-REFERENCE TO RELATED APPLICATION

This application claims the benefit of priority to U.S. Provisional Patent Application Ser. No. 62/502,069 entitled "DUAL FUNCTIONAL SUBSTRATES AND METHODS OF MAKING THE SAME," filed May 5, 2017, the disclosure of which is incorporated herein in its entirety by reference.

BACKGROUND

Surface enhanced Raman spectroscopy (SERS) and surface-enhanced infrared absorption spectroscopy (SEIRAS) can provide complementary spectroscopic data for analytes. However, a problem with either spectroscopic technique is the reliability or effectiveness of the substrate used in the machine. There is a need therefore, for improving the substrates used in SERS and SEIRAS.

SUMMARY OF THE DISCLOSURE

The present disclosure provides a substrate for use in surface enhanced spectroscopy. The substrate can include a polymeric membrane, a semi-conductive coating on the polymeric membrane, and a plurality of metallic nanoparticles on the semi-conducive coating.

The present disclosure further provides a method of making a substrate for use in surface enhanced spectroscopy. The substrate can include a polymeric membrane, a semi-conductive coating on the polymeric membrane, and a plurality of metallic nanoparticles on the semi-conducive coating. The method includes at least partially filtering a suspension of a semi-conductive material through the membrane to form the semi-conductive coating on the membrane. The method further includes at least partially immersing the membrane having the semi-conductive coating into a solution of metal ions. The method further includes irradiating the metal ions to form metallic nanoparticles on the semi-conductive coating and form the substrate.

The present disclosure further provides a method of generating a spectrum, the method includes integrating a substrate into at least one of a surface enhanced Raman spectroscopy machine and a surface enhanced infrared absorption spectroscopy machine. The substrate can include a polymeric membrane, a semi-conductive coating on the polymeric membrane, and a plurality of metallic nanoparticles on the semi-conducive coating. The method further includes contacting a solution containing an analyte with the substrate. The method further includes generating a corresponding surface enhanced Raman spectrum or surface enhanced infrared spectrum.

The present disclosure further includes a substrate for use in at least one of surface enhanced Raman spectroscopy and surface enhanced infrared absorption spectroscopy. The substrate includes a membrane comprising polyvinylidene fluoride, a coating comprising $TiO_2$ on about 100% surface area of a first surface of the membrane, and at least one of a plurality of $Ag_2O$ nanoparticles, a first plurality of elemental silver nanoparticles and a second plurality of elemental gold nanoparticles, and an alloy comprising elemental silver nanoparticles and elemental gold nanoparticles on the $TiO_2$ coating.

There are several advantages associated with the substrates and methods of this disclosure, some of which are unexpected. For example, according to some the substrates can allow for detection of ultra-trace levels of various analytes and distinct quantitative capacities for surface enhanced Raman spectroscopy (SERS) and surface-enhanced infrared absorption spectroscopy (SEIRAS). According to some embodiments, high reproducibility of the SERS/SEIRAS spectra is found, which confirms the reliability of the substrate used in either spectroscopic method. Additionally, according to some embodiments, integrating SERS and SEIRAS on a single substrate can allow for more detailed and complimentary investigations of molecular structure, orientation, conformation and adsorbate-substrate interactions. Furthermore, according to some embodiments, the hybrid semiconducting substrates can be used in both SERS and SEIRAS, thus saving costs and opening new opportunities for the broader development of surface enhanced vibrational spectroscopy techniques. Additionally, according to some examples, the substrates can allow for more effective analysis of samples having mixtures of both Raman-active and IR-active compounds in that the same substrate can be used for analysis of the same sample.

BRIEF DESCRIPTION OF THE FIGURES

The drawings illustrate generally, by way of example, but not by way of limitation, various embodiments discussed in the present document.

FIG. 1A is an exploded schematic view of substrate 100. Substrate 100 includes polymeric membrane 102, a layer of semi-conductive coating 104 on the polymeric membrane, and a layer of metallic nanoparticles 106 on the semi-conductive coating. FIG. 1B is a perspective view of the substrate showing that the layer of nanoparticles can be distributed about the semi-conductive coating.

FIG. 5A shows IR spectra of 4-MBA in the concentration range of 0.01-100 mg/L, in accordance with various embodiments.

FIG. 5B shows magnified views of the IR spectra at concentrations of 0.01, 0.1, 1, 5, 10, 20 mg/L in the 1570-1600 cm$^{-1}$ region, in accordance with various embodiments.

FIG. 5C shows the relationship between the IR peak area in 1570-1596 cm$^{-1}$ region and the concentration of 4-MBA, in accordance with various embodiments.

DETAILED DESCRIPTION OF THE INVENTION

Figure 1B:
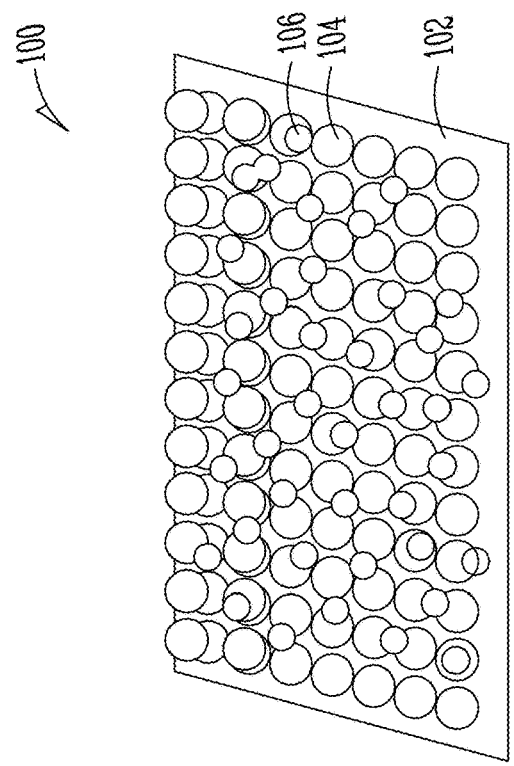
FIG. 1B is perspective view of the substrate in accordance with various embodiments.
Figure 1A:
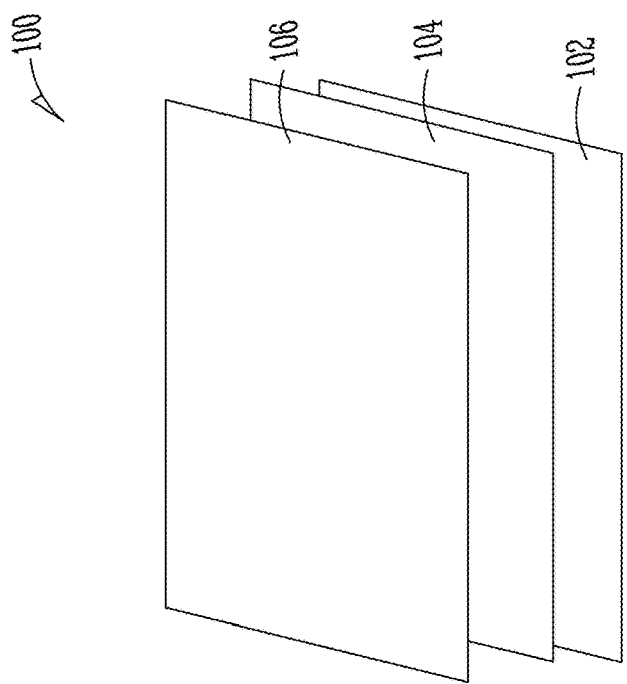
FIG. 1A is a schematic view exploded of a substrate, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

According to various embodiments of the present disclosure, a substrate can be used to perform surface enhanced spectroscopy. Examples of suitable machines can include least one of surface enhanced Raman spectroscopy (SERS) and surface enhanced infrared absorption spectroscopy (SEIRAS) machines. Surface-enhanced Raman spectroscopy is a surface-sensitive technique that enhances Raman scattering by molecules adsorbed on metal surfaces or by nanoparticles. The enhancement factor can be as much as $10^{10}$ to $10^{11}$ compared to standard Raman spectroscopy, which means the technique may detect single molecules. Surface-enhanced infrared absorption spectroscopy is a surface-sensitive technique that enhances infrared absorption by molecules adsorbed on metal surfaces or by nanoparticles. The enhancement factor can be as much as $10^{10}$ to $10^{11}$ compared to standard infrared absorption spectroscopy, which means the technique may detect single molecules.

The substrate can be a component of a machine exclusively for performing SERS or SEIRAS. The substrate can also be a component of a machine that can selectively perform SERS and SEIRAS. The substrate can include a polymeric membrane. The polymeric membrane can be flexible or rigid. A semi-conductive coating can be applied to the membrane to cover at least a portion of the membrane. Additionally, a plurality of metallic nanoparticles can be applied to the semi-conducive coating to at least partially form an external surface of the substrate. The metallic nanoparticles can include metals, metal oxides, mixtures thereof, alloys thereof, or combinations thereof.

The membrane can include one or more polymers. The one or more polymers ranges from about 50 wt % to about 100 wt % of the polymeric membrane, about 70 wt % to about 100 wt %, or 95 wt % to about 100 wt %, less than, equal to, or greater than about 50 wt %, 55, 60, 65, 70, 75, 80, 85, 90, 95, or 100 wt %. While not so limited, suitable examples of the one or more polymers can include polyvinylidene fluoride, polyethylene, polypropylene, polyvinyl chloride, polystyrene, polyamide, polytetrafluoroethylene, thermoplastic polyurethane, copolymers thereof, or mixtures thereof. In some examples, the membrane is porous. The porosity of the membrane can be a result of the membrane having a plurality of pores independently ranging in size from about 100 nm to about 900 nm, about 200 nm to about 800 nm, about 300 nm to about 700 nm, less than, equal to, or greater than about 100 nm, 200, 300, 400, 500, 600, 700, 800, or 900 nm.

The selection of the polymer or polymers of the membrane can be driven by various factors. For example, it can be desirable to select polymers that are relatively flexible or elastomeric. This can be desirable in cases where the membrane is fitted around an existing substrate in a machine. For example, an existing Raman spectroscopy machine or infrared absorption spectroscopy machine can have an existing substrate that is not suitable for either SERS or SEIRAS. The substrate of the instant disclosure however, can be easily fit over the existing substrate in such a machine.

The semi-conductive coating can be applied to about 50% surface area to about 100% surface area of at least one of a first surface, an opposed second surface, or a sidewall therebetween of the membrane, about 60% surface area to about 90% surface area, less than, equal to, or greater than about 50% surface area, 55, 60, 65, 70, 75, 80, 85, 90, 95, or 100% surface area. If the membrane is porous, then the coating can penetrate through the pores to the interior of the membrane. The semi-conductive coating can include any suitable material. Generally, a suitable material will be a material configured to transfer an electron to at least one of the metallic nanoparticles upon exposure of the material to at least one of visible light or infrared radiation. While not so limited, examples of suitable materials can include $TiO_2$, $Cu_2O$, $CuO$, $Bi_2O_3$, $SnO_2$, $SnS_2$, $ZnO$, mixtures thereof, or combinations thereof.

A plurality of semi-conductive nanoparticles can be applied to the semi-conductive coating. The semi-conductive nanoparticles can be applied to about 50% surface area to about 100% surface area of the semi-conductive coating, about 60% surface area to about 90% surface area, less than, equal to, or greater than about 50% surface area, 55, 60, 65, 70, 75, 80, 85, 90, 95, or 100% surface area. Individual semi-conductive nanoparticles can be one of many suitable types of nanoparticles. Examples of suitable nanoparticles include an $Ag_2O$ nanoparticle, an elemental silver nanoparticle, an elemental gold nanoparticle, an elemental copper nanoparticle, an elemental platinum nanoparticle, a nanoparticle of an elemental gold and elemental silver nanoparticle, mixtures thereof, alloys thereof, or combinations thereof. As generally understood, nanoparticles are particles between 1 and 100 nanometers in size. In nanotechnology, a particle is defined as a small object that behaves as a whole unit with respect to its transport and properties. Particles can be further classified according to diameter. Ultrafine particles are the same as nanoparticles and between 1 and 100 nanometers in size, fine particles are sized between 100 and 2,500 nanometers, and coarse particles cover a range between 2,500 and 10,000 nanometers.

In examples of the substrate where the metallic nanoparticles are a mixture of elemental silver nanoparticles and elemental gold nanoparticles, each type of nanoparticle can account for a different wt % of the mixture. For example, the elemental silver nanoparticles can range from about 10 wt % to about 95 wt % of the mixture, about 30 wt % to about 70 wt %, less than, equal to, or greater than about 10 wt %, 15, 20, 25, 30, 35, 40, 45, 50, 55, 60, 65, 70, 75, 80, 85, 90, or 95 wt %. Similarly, the elemental gold nanoparticles can range from about 10 wt % to about 95 wt % of the mixture, about 30 wt % to about 70 wt %, less than, equal to, or greater than about 10 wt %, 15, 20, 25, 30, 35, 40, 45, 50, 55, 60, 65, 70, 75, 80, 85, 90, or 95 wt %.

In examples of the substrate where the metallic nanoparticles are an alloy of elemental gold and elemental silver, the elemental gold and elemental silver can account for a different wt % of the alloy. For example, the elemental silver can range from about 10 wt % to about 95 wt % of the alloy, about 30 wt % to about 70 wt %, less than, equal to, or greater than about 10 wt %, 15, 20, 25, 30, 35, 40, 45, 50, 55, 60, 65, 70, 75, 80, 85, 90, or 95 wt %. Similarly, the elemental gold can range from about 10 wt % to about 95 wt % of the alloy, about 30 wt % to about 70 wt %, less than, equal to, or greater than about 10 wt %, 15, 20, 25, 30, 35, 40, 45, 50, 55, 60, 65, 70, 75, 80, 85, 90, or 95 wt %.

In operation, at least one analyte will bind to at least nanoparticle. In some instances, however, an analyte of interest may not have a strong affinity for the nanoparticle(s) that are deposited on the substrate. Accordingly, it can be desirable to include a surface coating on at least one nanoparticle. The surface coating can be applied to about 50% surface area of the nanoparticle to about 100% surface area of the nanoparticle, about 60% surface area to about 90% surface area, less than, equal to, or greater than about 50% surface area, 55, 60, 65, 70, 75, 80, 85, 90, 95, or 100% surface area. The surface coating can include many suitable coatings. Non-limiting examples of suitable coatings can include an antibody, an analyte specific targeting group, a compound having an end group, and combinations thereof, in which the compound having an end group includes at least one of a nucleophilic end group, electrophilic end group, a hydrophobic end group, and a hydrophilic end group.

In general, the substrates of the present disclosure can be manufactured by at least partially filtering a suspension of a semi-conductive material precursor through the membrane. The semi-conductive coating precursor can be a collection of the molecules ultimately forming the coating. For example, the precursor can be a solution of $TiO_2$. In this example the $TiO_2$ of the suspension is deposited on the membrane to form the semi-conductive coating.

Once the semi-conductive coating is formed on the membrane, the coated membrane is at least partially immersed in a solution of metal ions. Examples of suitable metal ions can include $AgNO_3$, $HAuCl_4$, or combinations thereof. Once deposited on the semi-conductive coating, the ions can be irradiated with a source of ultraviolet radiation (e.g., an Hg lamp) for a suitable amount of time to form the nanoparticle.

Figure 2:
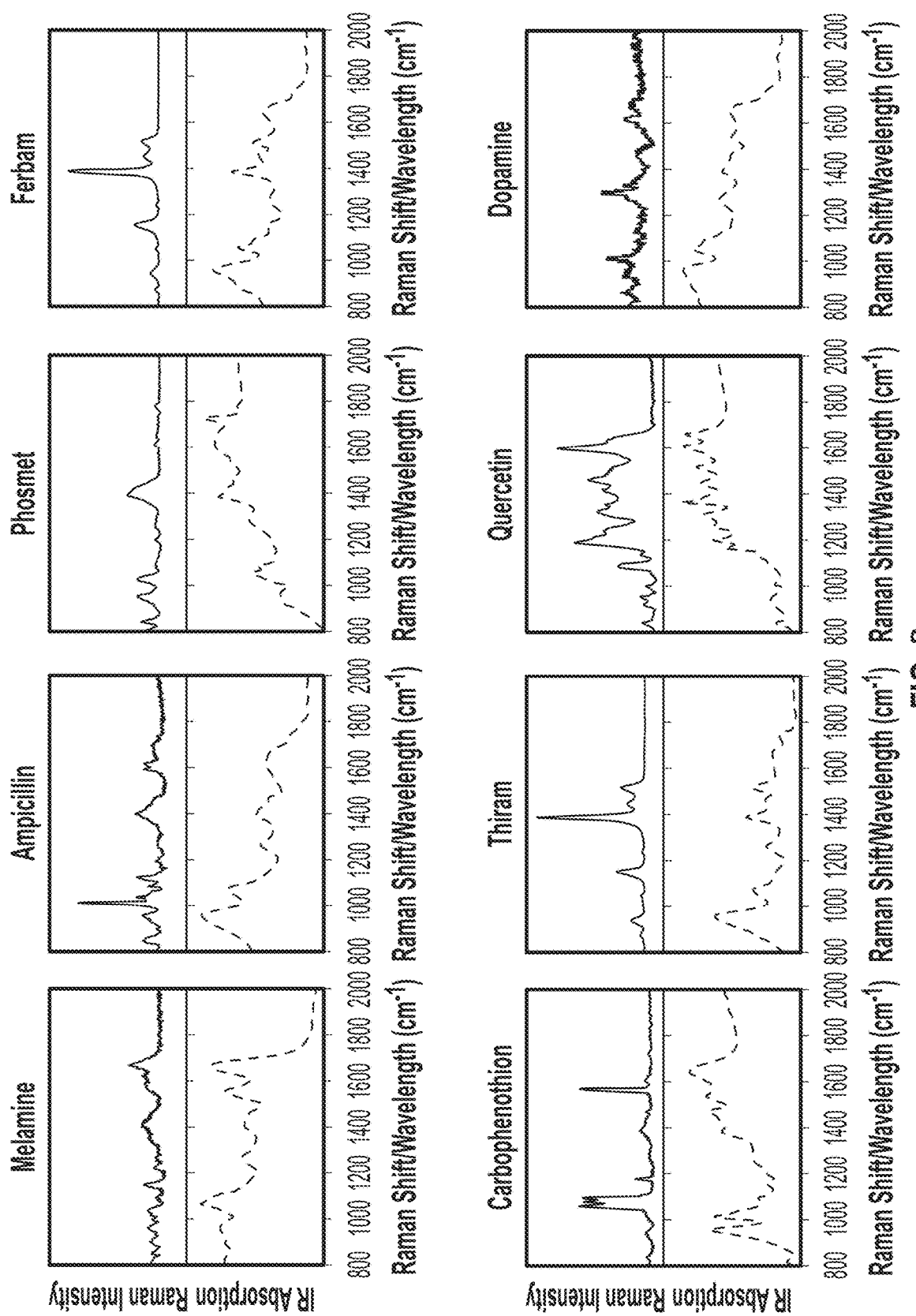
FIG. 2 shows examples of Ramen and IR spectra of various analytes, in accordance with various embodiments.
Figure 3:
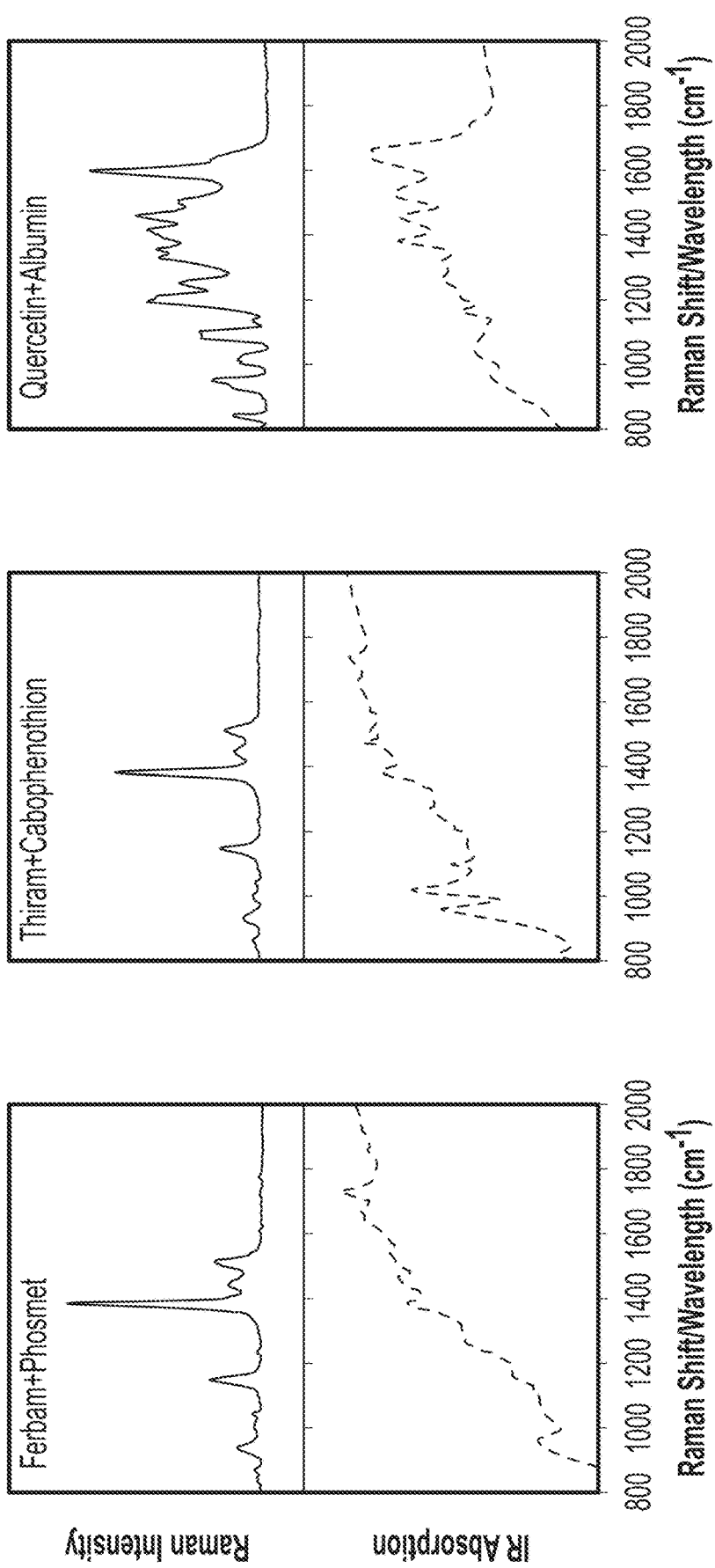
FIG. 3 shows examples of Ramen and IR spectra of mixtures of various analytes, in accordance with various embodiments.

Once formed, the substrate can be used in conjunction with a method of generating a spectrum. The method can include integrating the substrate into at least one of a surface enhanced Raman spectroscopy machine and a surface enhanced infrared absorption spectroscopy machine. A solution containing at least one analyte is contacted with the substrate. Non-limiting examples of suitable analytes may include pesticides such as thiram or thiabendazole. The pesticides can be detected in trace amounts as components of foods or waters as examples. Other examples of analytes of interest can include 4-mercaptobenzoic acid, melamine, ampicillin, phosmet, ferbam, carbophenothion, thiram, quercetin, dopamine, albumin, lyseine, bovine serum albumin, gentamicin, neomycin, streptomycin, or mixtures thereof. FIGS. 2 and 3 show examples of Ramen intensity and infrared absorption spectra for some of these analytes and mixtures of the analytes. The contact between the substrate and the analyte can involve one of many types of interactions. For example, the analyte can interact with at least one metallic nanoparticle through a covalent bond, an ionic bond, a van der Waals force, a hydrogen bond, and a mechanical connection. Any of these interactions can be enhanced through a surface coating on the nanoparticles. After contact between the analyte and the substrate a corresponding surface enhanced Raman spectrum or surface enhanced infrared spectrum can be generated.

EXAMPLES

Various embodiments of the present invention can be better understood by reference to the following Examples which are offered by way of illustration. The present invention is not limited to the Examples given herein.

Example 1 $Ag_2O/TiO_2$ Nanoparticle Substrate $TiO_2$ stock suspension was prepared by suspending an accurate amount of $TiO_2$ nanopowders (20 nm, anatase) in deionized water and the final concentration was 1 g/L. The suspension was vortexed vigorously for 2 min at ambient temperature, and then submitted to a sonication process for 5 min. The obtained stock suspension was kept at 4° C. in the dark. The substrate was prepared as follows: 1 mL of $TiO_2$ suspension was filtered through a Durapore® (made of polyvinylidene difluoride, PVDF) membrane filter (220 nm pore size, 13 mm OD) using a syringe filter holder (Sartorius Stedim Biotech Gmbh, Germany). The filtration was repeated two times. The deposition of $TiO_2$ was found to shield the Raman/IR signal of PVDF membrane because $TiO_2$ has no absorbance in the range of 4000-1000 $cm^{-1}$. The TiO$_2$ film was also found to provide a smooth and flat surface for analyte adsorption. The membrane was then removed from the filtration apparatus and washed with deionized water. Afterwards, the as-prepared TiO$_2$-deposited PVDF membrane was immersed into a 10$^{-3}$ M AgNO$_3$ solution in 12-well plates placed in a dark room. The solution was irradiated for 0.5 h by a 40 W mercury lamp with a maximum emission at 254.6 nm, and the UV-lamp to the substrate distance was kept at 15 cm. The deposition of Ag element on TiO$_2$ surface was triggered via a photoreduction process under UV-irradiation. After illumination, the TiO$_2$ surface became dark brown. The obtained Ag modified TiO$_2$-deposited membrane was thoroughly washed with distilled water and dried at room temperature in the dark. The loading of Ag was estimated by measuring the unused precursor concentration after the photodeposition using inductively coupled plasma-mass spectrometry (ICP-MS, Agilent 7500ce, Santa Clara, Calif.).

The membrane was vacuum-dried overnight and characterized by scanning electron microscopy (SEM) using a FEI Magellan 400 (FEI, OR) with an accelerating voltage of 5 kV under low vacuum conditions. The structure of Ag$_2$O/TiO$_2$ was evaluated by high resolution transmission electron microscopy (HRTEM, JEOL, 200FX, USA) coupled with energy dispersive spectrometry (EDS). X-ray photoelectron spectroscopy (XPS) studies were carried on a Physical Electronics Quantum 2000 spectrometer using a monochromatic Al Kα excitation at a spot size of 200 μm with pass energy of 46.95 eV at 15° take-off angle. All banding energies were referenced at 284.6 eV, as determined by the location of the peak C is spectra, which gave banding energies values within an accuracy of ±0.1 eV. X-ray powder diffraction (XRD) patterns of Ag$_2$O/TiO$_2$ were obtained using a PANalytical X'Pert diffractometer using Cu Kα radiation. UV-vis diffuse reflectance spectra (DRS) were recorded on a LAMBDA™ 1050 UV/vis/NIR spectrometer along with 150-mm integrating sphere (PerkinElmer, Inc., Shelton, Conn. USA).

In this Example, 4-mercaptobenzoic acid (4-MBA) and bovine serum albumin (BSA) were chosen as model analytes to investigate the performance of the as-prepared substrate for SERS/SEIRAS detection. The Raman and IR samples were prepared as follows: the substrate was soaked in 1 mL analyte solution of different concentrations in a 12 well plate. After 1 h incubation, the substrate was taken out from plate followed by washing with deionized water and air-drying. For reference, the bare TiO$_2$-deposited PVDF membrane without Ag deposition was incubated with the analyte solution. For SERS measurement, the dried substrate was directly placed on the stage for scanning. Raman spectra were obtained using a DXR Raman microscope (Thermo Fisher Scientific, Waltham, Mass.) equipped with a 780 nm excitation laser and a 10× objective. The resulting laser spot diameter was about 3.0 μm with a spectral resolution of 5 cm$^{-1}$. The Raman measurements were performed with 5 mW and 50 μm slit aperture for 2 s integration time. More than ten discrete locations were randomly chosen on substrate under Raman microscope and analyzed within a spectrum range of 100-3000 cm$^{-1}$. The attenuated total reflectance (ATR)-FTIR spectra were collected by IRTracer-100 Shimadzu equipped with a Pike MIRacle ATR accessory and a high pressure clamp. The substrate was turned around to closely contact with ATR crystal upon pressure. Four different positions on each substrate were scanned from 500 to 4000 cm$^{-1}$. Each experiment was carried out in triplicate. For the mapping measurement of SEIRAS, a Shimadzu AIM 8800 microscope with an auto-XY stage positioning was used. FTIR spectrometer and a 6464 MCT FPA detector (Stingray imaging Spectrometer) was used to acquire data at 8 cm$^{-1}$ resolution under N$_2$ purge. This allowed information on analyte distributions to be obtained from a 450 μm×450 μm region with a step size of 50 μm. Therefore, both the scanned area for SERS and SEIRAS contain 10×10 individual points which should be statistically presentative for the sample. Imaging data was analyzed with IR solution software. The second deviation of peak intensity were calculated for each spectrum, and infrared images were created on the basis of these second derivative of IR absorbance.

All spectra were analyzed using OMINICS software (Thermo Fisher Scientific, Waltham, Mass.). The spectra from different locations in each sample were averaged to get a final spectrum. Data are presented as a mean value with its standard deviation indicated (mean±SD).

Raman enhancement factor (EF) for the substrate was calculated using the following equation:

$$\text{Raman } EF = \frac{I_{SERS}/I_{RS}}{C_{SERS}/C_{RS}}$$

Where $I_{SERS}$ and $I_{RS}$ represent the SERS peak intensity of the 10 mg/L 4-MBA (BSA) at 1582 cm$^{-1}$ (1449 cm$^{-1}$) on Ag$_2$O/TiO$_2$ and the Raman peak intensity of 10 g/L 4-MBA (BSA) at 1582 cm$^{-1}$ (1449 cm$^{-1}$) on the pure TiO$_2$. $C_{SERS}$ and $C_{RS}$ represent the concentration of 4-MBA (BSA) incubated with Ag$_2$O/TiO$_2$ and pure TiO$_2$, respectively. IR enhancement factor (EF) for the inventors' fabricated substrate was calculated using the following equation:

$$IR\ EF = \frac{I_{SEIRAS}/I_{IRAS}}{C_{SEIRAS}/C_{IRAS}}$$

Where $I_{SEIRAS}$ and $I_{IRAS}$ represent the SEIRAS peak absorption of the 10 mg/L 4-MBA (BSA) at 1590 cm$^{-1}$ (1538 cm$^{-1}$) on Ag$_2$O/TiO$_2$ and the IR absorption of 0.1 g/L 4-MBA (BSA) at 1590 cm$^{-1}$ (1538 cm$^{-1}$) on the bare TiO$_2$. $C_{SEIRAS}$ and $C_{IRAS}$ represent the concentration of 4-MBA (BSA) incubated with Ag$_2$O/TiO$_2$ and pure TiO$_2$, respectively. To determine EF value, the inventors assumed that all of the 4-MBA molecules and BSA were adsorbed on the silver surface. Thus, the EF value the inventors obtained was an underestimated value, and the real EF value could actually be some orders of magnitude higher. The standard deviation in SERS and SEIRAS enhancement σ for the substrate was estimated as follows:

$$\sigma = \frac{1}{\bar{I}}\sqrt{\frac{1}{N}\sum_{i=1}^{N}(I_I - \bar{I})^2} \times 100\%, \ \bar{I} = \frac{1}{N}\sum_{i=1}^{N}I_i$$

Where N is the number of SERS/SEIRAS spectra of analytes, which are measured at different locations on the same substrate, $I_i$ is the analytes Raman or IR signal detected at the ith location, and $\bar{I}$ is the average signal intensity. Herein, a total of 100 (10×10) SERS/SEIRAS spectra have been measured.

In a two-step deposition technique for forming the substrate an appropriate volume of TiO$_2$ suspension (particle size 20 nm) was filtered through a PVDF membrane (220 nm pore size) using an injection syringe. Due to the significant aggregation of $TiO_2$, it was inferred that most of the $TiO_2$ particles were trapped on the membrane. This was also confirmed by the transparent solution after filtration. Different from the calcined $TiO_2$ film usually used for Ag nanoparticles growth, $TiO_2$ was directly deposited on/in PVDF membrane to form a porous net structure. The 3D nanostructures not only possess high surface-to-volume ratio for analytes adsorption, but also facilitate the formation of Ag (I) oxides ($Ag_2O$) onto $TiO_2$ surface forming heterostructure. PVDF membrane itself can produce Raman and IR singles, especially the strong IR adsorption in the range of 800-1500 $cm^{-1}$. To shield the signal from PVDF membrane, the concentration of $TiO_2$ was optimized to completely cover the membrane, as $TiO_2$ did not have any IR absorption in the mid-infrared range. After deposition of $TiO_2$ nanoparticles at 1 g/L on PVDF membrane, no observable IR signals can be detected ranging from 1000-4000 $cm^{-1}$. Therefore, the deposited $TiO_2$ film in the example not only served as an active substrate but also provided clean IR background for the ease of signal identification. The subsequent deposition of Ag element on the surface of $TiO_2$ film was triggered in $AgNO_3$ solution via a photoreduction process under UV irradiation. After illumination, the $TiO_2$ surface became dark brown. Substantially no background signal was detected after photodeposition of $Ag_2O$. For Raman measurement the dried substrate was directly placed on the stage, while for FTIR-ATR it was turned around to closely contact with ATR crystal upon pressure.

The scanning electron microscopy (SEM) images revealed that bare $TiO_2$ surface presented a porous, sponge like network of high roughness and complexity. Such structure allowed a large contact area between the surface species and substrate, and thus high efficient SERS and SEIRAS. The treatment of UV irradiation in $AgNO_3$ solution induced a slight aggregation of $TiO_2$ nanoparticles and an increase of the surface roughness. HRTEM image and EDS analysis were used to confirm the formation of heterostructure. It was found that $Ag_2O$ nanoparticles of size 5-10 nm were tightly coupled on the $TiO_2$ surface. Compared with the precursor $TiO_2$, new XPS peaks of Ag element were found after UV irradiation in addition to the Ti, 0, and C elements based on XPS survey spectra. The strong XPS peak of Ag 3d at 367.7 eV demonstrated that the predominant silver moiety on the surface of $TiO_2$ was Ag (I) in the form of $Ag_2O$. The amount of Ag (I) on the surface of $TiO_2$ was ca. 10 atom %. Using ICP-MS, the loading of Ag was estimated to be 0.7 wt %. The amount of Ag in the substrate can be adjusted by varying the concentration of $AgNO_3$ solution. Here, the inventors used an intermediate concentration $10^{-3}$ M. Higher Ag loading may block the light adsorption of $TiO_2$, and thus decrease the overall SERS/SEIRAS activities.

The presence of Ag (I) oxides may be due to reverse spillover of oxygen-ions from the $TiO_2$ support onto the surface of metal crystallites. XRD patterns of $Ag_2O/TiO_2$ demonstrate a strong peak at $2\theta=25.5°$, representative for (101) anatase phase reflections of $TiO_2$. XRD patterns for $Ag_2O/TiO_2$ exhibit peaks corresponding to hexagonal $Ag_2O$ {100} and {011} planes at 34.2° and 38.39°, respectively. UV-vis diffuse reflectance spectra (UV-vis DRS) further characterized the composition and microstructures of the substrates.

Bare $TiO_2$ film exhibited a steep adsorption edge located at 380 nm, while $Ag_2O/TiO_2$ nanocomposites exhibited an absorption shoulder at around 450 nm indicating surface plasmon absorption. Meanwhile, higher photoabsorption was observed in the visible and infrared region (>400 nm). This can be explained by the fact that $Ag_2O$ acts as visible-light sensitization with a strong and wide absorption band in the visible/infrared light region.

To demonstrate the universality of the substrate the inventors have shown here the SERS/SEIRAS spectra of two probe analytes, e.g., 4-mercaptobenzoic acid (4-MBA) and bovine serum albumin (BSA) which have distinct Raman/IR activities. The two analytes can be chemisorbed to the $Ag_2O/TiO_2$ surface via covalent interaction between Ag/Ti and their functional groups (—SH, —$NH_2$, or —OH). It was shown that the substrate can provide rich and complementary characteristic Raman/IR vibrational modes.

In the case of 4-MBA, the ν (C—C) ring-breathing modes (1070 $cm^{-1}$ and 1575 $cm^{-1}$) were very strong in the SERS, while the former was not observable in SEIRAS. This phenomenon was also apparent for ν (C=O) at 1284 $cm^{-1}$. The ν ($COO^-$) at 1400 $cm^{-1}$ was an example of a vibration that had strong IR dipole moment, but was SERS inactive due to a small polarizability. Similarly, the strong amide II of BSA was detected in SEIRAS, but disappeared in SERS. Furthermore, the characteristic vibrational modes were greatly enhanced and high-quality SERS/SEIRAS spectra of analytes were acquired across much of the Raman/IR fingerprinting region. A Raman enhancement factor (EF) up to $1.8×10^5$ (4-MBA) and $1.1×10^4$ (BSA) was observed on $Ag_2O/TiO_2$ nanocomposite film. The remarkable Raman enhancement factor of 4-MBA from the $Ag_2O/TiO_2$ substrate was at least two orders of magnitude higher than that from Ag—$TiO_2$ nanocomposites reported elsewhere. Meanwhile, the IR enhancement was also found to be as high as 45.8 (4-MBA) and 55.6 (BSA), respectively.

Without intending to be bound to any theory, the inventors suspect that such superior SERS/SEIRAS activities are attributed to the synergetic contribution of $Ag_2O$ and $TiO_2$. Under an excitation of visible light, the photon energy was neither sufficient to excite the electrons transitions from the VB to CB of $TiO_2$, nor from the highest occupied molecular orbital (HOMO) to lowest unoccupied molecular orbital (LUMO) of adsorbed molecules. However, the presence of surface defects on $TiO_2$ can make the electrons in $TiO_2$ valence band (VB) be excited to surface state energy levels (Ess) by the incident light with the sub-band gap energy and then inject into the LUMO of the adsorbed analytes. The transferred electron would eventually transit back to the semiconductor and recombine with the hole in the VB of $TiO_2$. Thus, the dominant contribution to SERS of $TiO_2$ is proposed to be associated with the $TiO_2$-to-molecule charge transfer (CT) mechanism, e.g., photon-induced CT (PICT). $Ag_2O$ is a p-type semiconductor with a narrow energy band gap of 1.46 eV. Under visible/infrared-light irradiation, $Ag_2O$ can be excited to produce photogenerated $h^+$ and $e^-$. Owing to the p-n junction heterostructure and energy band match of $Ag_2O$ and $TiO_2$, the photogenerated electrons excited from the energy level of $Ag_2O$ would transfer to the conduction band (CB) of $TiO_2$, while the photogenerated holes remain on the Ag-doping energy level. Therefore, $Ag_2O$ can work as an efficient cocatalyst to promote the electron-hole separation and interfacial charge transfer. Photoelectrochemical studies demonstrated that $Ag_2O$ even had the greater capacity to transfer electrons to $TiO_2$ than Ag nanoparticle under visible light. Thus, it is reasonable to extend such photocatalytic theory to chemical enhancement mechanisms of SERS/SEIRAS, where the additional large number of photogenerated electrons from $Ag_2O$ can take part in the $TiO_2$-to-molecule PICT mechanism. Meanwhile, the heterostructure of $Ag_2O/TiO_2$ can increase the thermodynamically allowed transitions in the PICT process because of both the VB and CB of $Ag_2O$ lie above that of $TiO_2$, thus enhancing Raman/IR signals. Note that electromagnetic enhancement may be also responsible for the SEIRAS activity, since the surface plasmon resonant frequency of $TiO_2$ is located in the infrared region. The SEIRAS EF obtained from the semiconducting substrate were of the same order of magnitude as those achieved on noble metal-based SEIRAS substrate, e.g., Ag and Au nanoparticle film. On the other hand, the more Raman-active analyte (4-MBA) had higher SERS EF but lower SEIRAS EF, and more IR-active analyte (BSA) had lower SERS EF but higher SEIRAS EF. This finding suggested that the enhancement of this substrate was greatly dependent on the chemical nature of the probe analyte. These complementary and enhanced spectra implied that the substrate based on $Ag_2O/TiO_2$ nanocomposite film can provide complete surface-enhanced spectroscopic analysis of a given sample.

The profile of Raman/IR response to 4-MBA/BSA over a wide concentration range showed that 4-MBA had higher Raman response with a concentration detected as low as 0.01 mg/L (SERS) and 1 mg/L (SEIRAS), respectively. However, this trend was not followed by the more IR-active BSA, which can be detected as low as 0.1 mg/L (SEIRAS) compared to 1.0 mg/L (SERS). This difference suggested the dual response of the substrate depending on the chemical nature of adsorbed species. Previous studies revealed that the amount of analytes were linearly correlated with their signals of $v$ (COO—) mode (4-MBA) and amide I and amide II (BSA), respectively. The Raman intensity and IR second derivative absorbance of the corresponding peaks, were thus plotted as a function of analyte concentration.

It was noted that with increasing concentration the Raman signals of both BSA and 4-MBA greatly increased and finally reached a steady state. Whereas their IR absorption progressively increased within the tested concentration range. Without intending to be bound to any theories, this may be due to the fact that SERS and SEIRAS exhibit different dependences upon the distance to the surface. SERS is a short-range effect whereby most of the enhancement of vibrational modes is in the monolayer on the surface, whereas SEIRAS is a longer-range effect that can often lead to vibrational enhancement of a number of adsorbed layers. In this case, such distinct surface distance-dependence can explain why the Raman intensity reached saturation when the molecules were not close to the surface at high concentration while the IR absorption still increased. The linear behavior of SEIRAS response from the substrate was similar to the observations from Ag and Au nanostructured substrate that surface-enhanced IR absorbance will increase linearly with increasing adsorbed concentration of the analyte. Another reason for the broader quantitative range of SEIRAS could be the higher cross section of the IR absorption compared to the Raman scattering. The substrate displayed different quantitative capacities to the two analytes. For 4-MBA, the linear relationship ranged from 0.01-7 mg/L and 7-100 mg/L for SERS and SEIRAS, with a coefficient of determination ($R^2$) equal to 0.978 and 0.983, respectively. For BSA, the linear relationship ranged from 1-10 mg/L and 0.1-30 mg/L for SERS and SEIRAS with $R^2$ of 0.992 and 0.997, respectively. Note that although 4-MBA had lower EF of SEIRAS, its linear response of IR absorbance was observed up to 100 mg/L, much higher than 30 mg/L of BSA. One proposed fact was that the larger molecular structure of BSA probably generated thicker films on the substrate than 4-MBA and therefore, the signal was easier to reach saturation at high concentration. It further implied the dual selectivity of the substrate to enhance and quantify a specific probe analyte.

Besides sensitivity and quantitative capability, one factor for the real applications of the substrate is the good signal reproducibility produced from a uniform surface roughness. To evaluate that, Raman and IR mappings of 4-MBA and BSA have been obtained and analyzed. From the images, 100 spots were selected from a large area with a dimension of 450 μm in length and 450 μm in width. The standard deviation of 4-MBA in SERS and SEIRAS enhancement σ were calculated to be 8.21% and 9.26%, respectively. In the case of BSA, σ were respectively 9.32% in SERS and 7.59% in SEIRAS. The lower standard deviation than 10% indicated that both SERS and SEIRAS spectra were highly reproducible at different sites regardless of the adsorbates. Besides, such low spot-to-spot variance well demonstrated that the $Ag_2O$—$TiO_2$ nanocomposites deposited on PVDF membrane can be used as a reliable, uniform and reproducible substrate for both SERS and SEIRAS.

In Example 1, a powerful 3D substrate based on the $Ag_2O/TiO_2$ nanocomposite heterostructure coupled with a portable membrane support, was shown to provide an innovated, dual functional platform for chemical sensing applications by enhancing both Raman and IR spectroscopy. The surprising and unexpected enhancement factors of one or two orders of magnitude can be achieved over traditional semiconducting materials and are comparable to noble metal.

Example 2 Au—Ag/$TiO_2$ Substrate $TiO_2$ stock suspension was prepared by suspending an accurate amount of $TiO_2$ nanopowders (20 nm) in deionized water and the final concentration was 1 g/L. The suspension was vortexed vigorously for 2 min at ambient temperature, and then submitted to a sonication process for 5 min. The obtained stock suspension was kept at 4° C. in the dark. The Au—Ag/$TiO_2$ substrate was prepared as follows: 1 mL of $TiO_2$ suspension (1 g/L) was filtered through a Durapore® (made of polyvinylidene difluoride, PVDF) membrane filter (220 nm pore size, 13 mm OD) using a syringe filter holder (Sartorius Stedim Biotech Gmbh, Germany). The filtration was repeated two times. The membrane was then removed from the filtration apparatus and washed with deionized water. Afterwards, $TiO_2$ deposited PVDF membrane was immersed into a 2 mL $AgNO_3$ solution ($10^{-2}$ M) in a 12-well plate placed in a dark room. The solution was irradiated for 40 min by a 40 W mercury lamp with a maximum emission at 254.6 nm, and the distance between UV lamp and substrate was kept at 15 cm. The deposition of Ag species on $TiO_2$ surface was triggered via a photoreduction process under UV irradiation. After illumination, the $TiO_2$ surface became dark brown. The as-prepared Ag/$TiO_2$ deposited PVDF membrane was thoroughly washed with distilled water and transferred to another clean 12-well plate. Two milliliter buffer solution of different pH (5, 7, 9, and 11) adjusted with HCl or NaOH was added into the new plate under rotating. Next, $HAuCl_4$ aqueous solution of different concentrations ($10^{-5}$, $10^{-4}$, $10^{-3}$, and $10^{-2}$ M) was titrated at a rate of 0.02 mL/min with a syringe. After the completion of $HAuCl_4$ injection, the reaction was continued for 2 h. The Au—Ag/$TiO_2$ substrate was washed with distilled water twice and dried at room temperature in the dark.

The substrate was vacuum-dried overnight and characterized by scanning electron microscopy (SEM) using a FEI Magellan 400 (FEI, OR) with an accelerating voltage of 5 kV under low vacuum conditions. X-ray photoelectron spectroscopy (XPS) studies were carried on a Physical Electronics Quantum 2000 spectrometer using a monochromatic Al Kα excitation at a spot size of 200 μm with pass energy of 46.95 eV at 15° take-off angle. All banding energies were referenced at 284.6 eV, as determined by the location of the peak C 1s spectra, which gave banding energies values within an accuracy of ±0.1 eV. UV-vis diffuse reflectance spectra (UV-vis DRS) were recorded on a LAMBDA™ 1050 UV/vis/NIR spectrometer along with 150-mm integrating sphere (PerkinElmer, Inc., Shelton, Conn. USA).

In this Example, 4-mercaptobenzoic acid (4-MBA) was chosen as a model analyte to investigate the performance of the as-prepared substrate for SEIRAS detection. The IR samples were prepared as follows: The substrate was soaked in 1 mL analyte solutions of different concentrations in a 12 well plate. After 1 h incubation, the substrate was taken out followed by washing with deionized water and air-dried. For reference, 5 μL of 4-MBA solution (1 g/L) was directly dropped on the neat ZnSe prism. To investigate the universality of Au—Ag/TiO$_2$ substrate, two proteins (bovine serum albumin and lysozyme) with different charges at pH 7 and two commonly used Raman indicators (ferbam and rhodamine 6G) were selected. Before measurement, 1 mL of analyte (1 mg/L) was incubated with substrate in the same way to 4-MBA as described herein.

The attenuated total reflectance (ATR)-FTIR spectra were collected by IRTracer-100 Shimadzu equipped with a Pike MIRacle ATR accessory and a high pressure clamp. The substrate was turned around to closely contact with ATR crystal upon pressure. Four different positions on each membrane substrate were scanned from 1000 to 4000 cm$^{-1}$. Each experiment was carried out in triplicate. Therefore, each spectrum shown in this study was an average of at least 12 individual spectra. Spectral data were collected with IR solution software. All spectra were analyzed using OMINICS software (Thermo Fisher Scientific, Waltham, Mass.). The spectra from different locations in each sample were averaged to get a final spectrum. Data are presented as a mean value with its standard deviation indicated (mean±SD). IR enhancement factor (EF) for the inventors' substrate was calculated using the following equation:

$$SEIRAS\ EF = \frac{I_{SEIRAS}/I_{IRAS}}{C_{SEIRAS}/C_{IRAS}} \times \frac{PVDF\ membrane\ area}{IR\ detected\ area}$$

Where $I_{SEIRAS}$ and $I_{IRAS}$ represent the SEIRAS peak area ranging from 1604-1758 cm$^{-1}$ of the 100 mg/L 4-MBA on Au—Ag/TiO$_2$ and the IR absorption of 1 g/L 4-MBA (BSA) on the neat ZnSe prism. $C_{SEIRAS}$ and $C_{IRAS}$ represent the concentration of 4-MBA incubated with Au—Ag/TiO$_2$ and neat prism, respectively. To determine EF value, it is assumed that all of the 4-MBA molecules were adsorbed on the substrate surface. Thus, the EF value the inventors obtained was an underestimated value, and the real EF value could actually be some orders of magnitude higher.

A sequential deposition technique of forming the substrate includes filtering an appropriate volume of TiO$_2$ suspension (particle size 20 nm through a PVDF membrane (220 nm pore size) using an injection syringe. Due to the aggregation of TiO$_2$, most of the TiO$_2$ particles were trapped on the membrane. Different from the calcined TiO$_2$ film usually used for Ag nanoparticles growth, the inventors directly deposited TiO$_2$ on/in PVDF membrane to form a microporous net structure, which possess high surface-to-volume ratio for analytes adsorption. PVDF membrane was introduced as a portable support for Au—Ag/TiO$_2$. This flexible polymer membrane endows the substrate with a unique flexibility and strength, thus, the surface species on substrate can closely contact with ATR crystal external pressure. The subsequent deposition of Ag species on the surface of TiO$_2$ film was triggered in AgNO$_3$ solution via a photoreduction process under UV-irradiation. Using as-prepared Ag/TiO$_2$ as a sacrificial template, the Au was then deposited by performing a galvanic replacement reaction between Ag and a HAuCl$_4$ solution. The reaction is based on the theory that the higher standard reduction potential of AuCl$_4^-$/Au (0.99 V vs SHE) than that of the Ag$^+$/Ag (0.80 V vs SHE) allows AuCl$_4^-$ ions to oxidize Ag atoms in the solution phase as shown in the following replacement reaction:

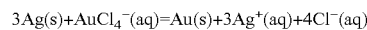

After the formation of Au—Ag/TiO$_2$ nanocomposites on the PVDF membrane, the substrate was thoroughly washed with distilled water to remove the AgCl byproduct. For sample preparation, the substrate was soaked in analyte solution for a certain time followed by washing twice with deionized water to remove un-adsorbed molecules and air dry. Then, the dried substrate was placed in direct contact with ATR crystal.

Figure 4A:
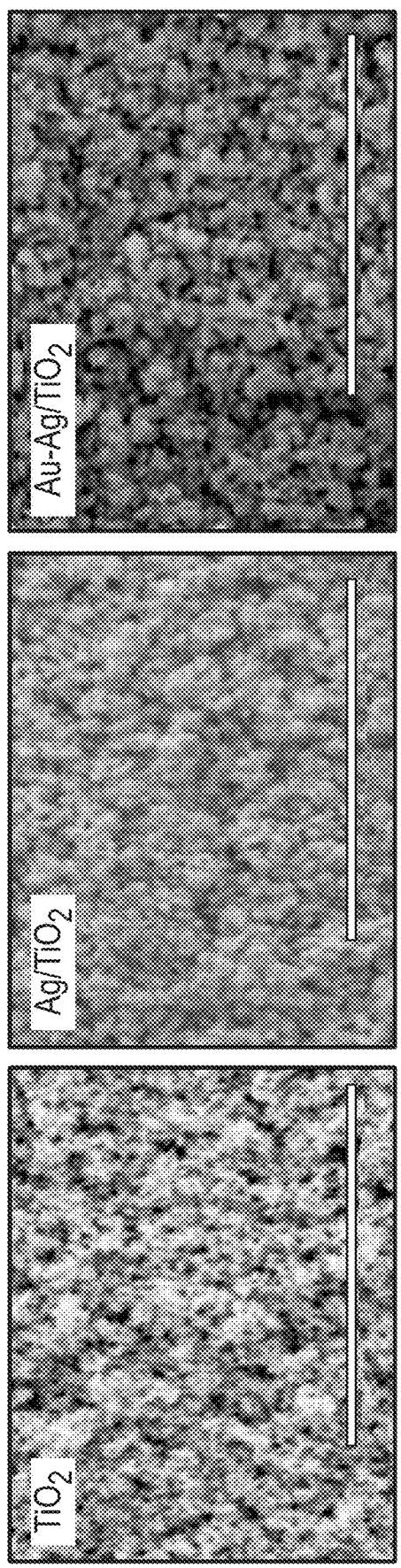
FIG. 4A shows SEM images for $TiO_2$, $Ag/TiO_2$ and $Au—Ag/TiO_2$ (scale bar of 5 µm), in accordance with various embodiments.
Figure 4B:
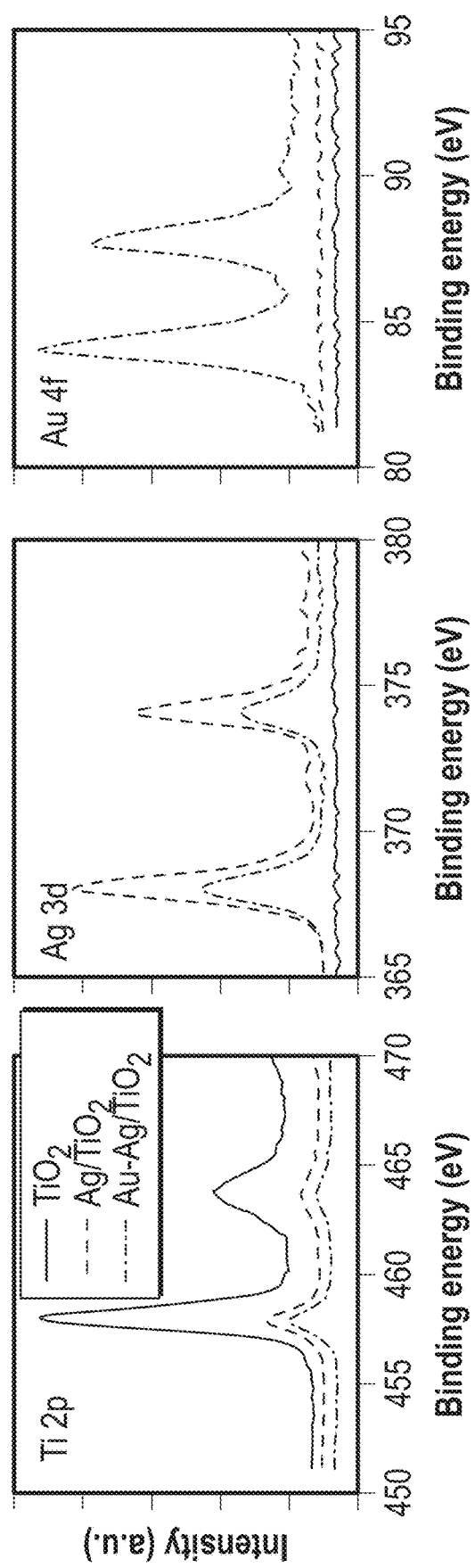
FIG. 4B shows UV-vis DRS of PVDF after $TiO_2$, Ag and Au deposition, inset is the corresponding photographs of substrates, in accordance with various embodiments.
Figure 4C:
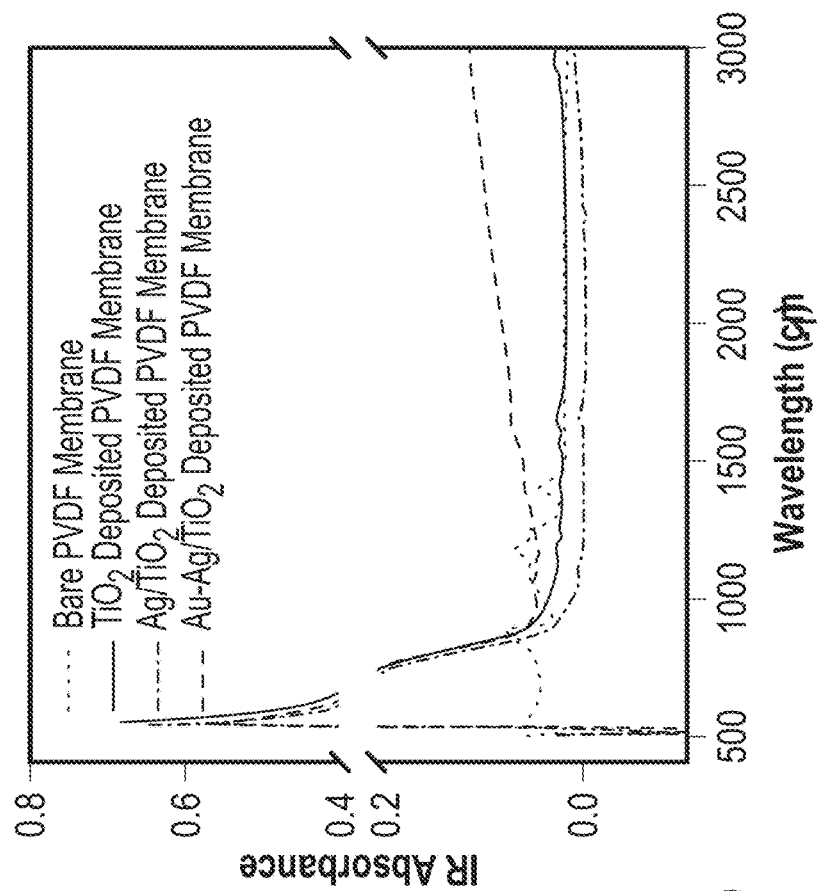
FIG. 4C shows XPS spectra of Ti 2p, Ag 3d, and Au 4f, in accordance with various embodiments.

SEM images presented that TiO$_2$ surface had a porous, sponge like network of high roughness and complexity. This is shown in FIG. 4A. Such structure allowed a large contact area between the adsorbate and substrate, and thus producing high efficient SEIRAS effect. Deposition of Ag species induced a slight aggregation of TiO$_2$ nanoparticles and an increase of surface roughness. After titration of HAuCl$_4$, some larger particles ranging from 40-70 nm generated on the TiO$_2$ surface, suggesting the involvement of galvanic replacement reaction. X-ray photoelectron spectroscopy (XPS) analysis provided the possible chemical statues of Ag and Au element. This is shown in FIG. 4B. Compared with the bare precursor TiO$_2$, new XPS peaks from Ag and Au elements can be identified clearly on substrate in addition to the Ti, 0, C elements based on XPS survey spectra. The strong and sharp XPS peaks of Ag 3d and Au 4f at 368.2 and 83.9 eV demonstrated that the predominant Ag and Au moiety on the surface of TiO$_2$ were metallic phase. The single peak from metallic Ag also indicated the complete removal of AgCl byproduct resulting from galvanic replacement reaction. The change in optical properties after each deposition process was visibly indicated by clear color changes, as shown by photographic images, see FIG. 4C. The white TiO$_2$ surface became dark brown after UV illumination in AgNO$_3$ solution. When the HAuCl$_4$ was titrated towards the Ag/TiO$_2$ template, the color of the substrate was gradually turned into purple with the galvanic replacement by Au. UV-vis diffuse reflectance spectra (UV-vis DRS) displayed that pure TiO$_2$ exhibited a steep adsorption edge located at 380 nm, while an absorption shoulder was detected at around 450 nm after Ag deposition, indicating the localized surface plasmon resonance (LSPR). The plasmonic peak was red-shifted to 580 nm after 2 mL 10$^{-3}$M of HAuCl$_4$ solution was introduced into the reaction system. This observation suggested the complete consumption of Ag/TiO$_2$ template and the formation of a homogeneous Ag—Ag nanocomposite. The single LSPR peak also revealed that the nanostructure was an alloy rather than core-shell nanoparticles, or a mixture of monometallic nanoparticles. The present UV-vis spectra were in good agreement with XPS results.

Figure 4D:
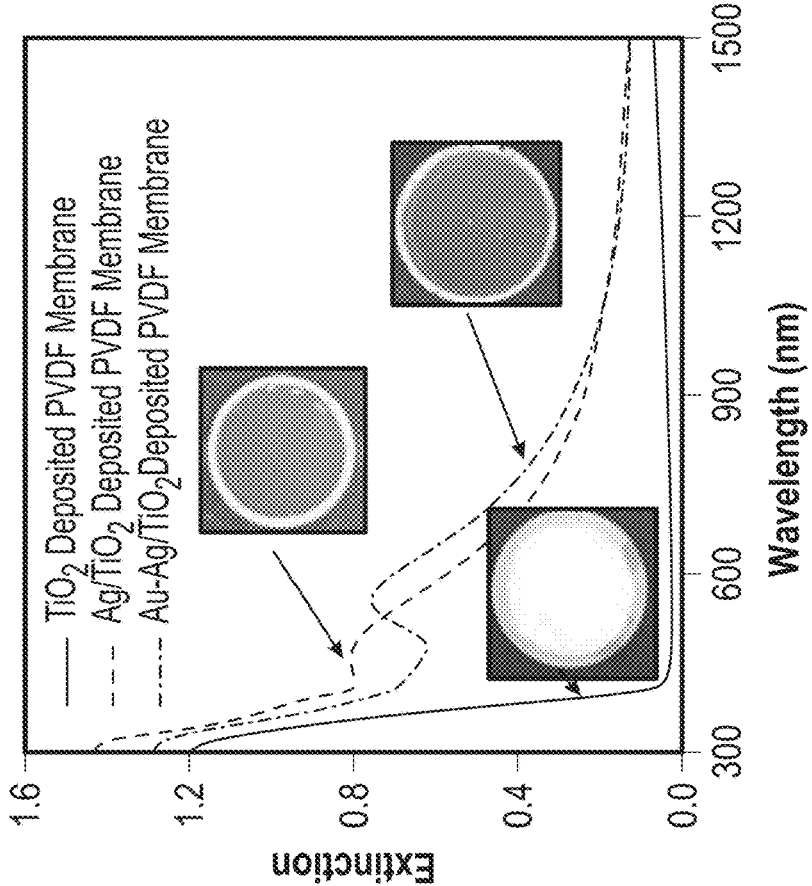
FIG. 4D shows IR spectra of PVDF membrane before and after $TiO_2$, Ag, and Au deposition, in accordance with various embodiments.

The PVDF membrane itself can produce strong IR signal, especially in the fingerprint region from 800 to 1500 cm$^{-1}$ this is shown in FIG. 4D. To shield the signal from PVDF membrane, the concentration of $TiO_2$ was optimized to completely cover the membrane, as $TiO_2$ did not have any IR absorption in the mid-infrared range. After deposition of $TiO_2$ nanoparticles at 1 g/L on PVDF membrane, no observable IR signals can be detected ranging from 1000-4000 cm$^{-1}$ (FIG. 4D). Thus, the $TiO_2$ film not only served as an active substrate but also provided clean IR background for the ease of signal identification. Additionally, no background signal was detected even after deposition of Ag and Au.

Figure 4E:
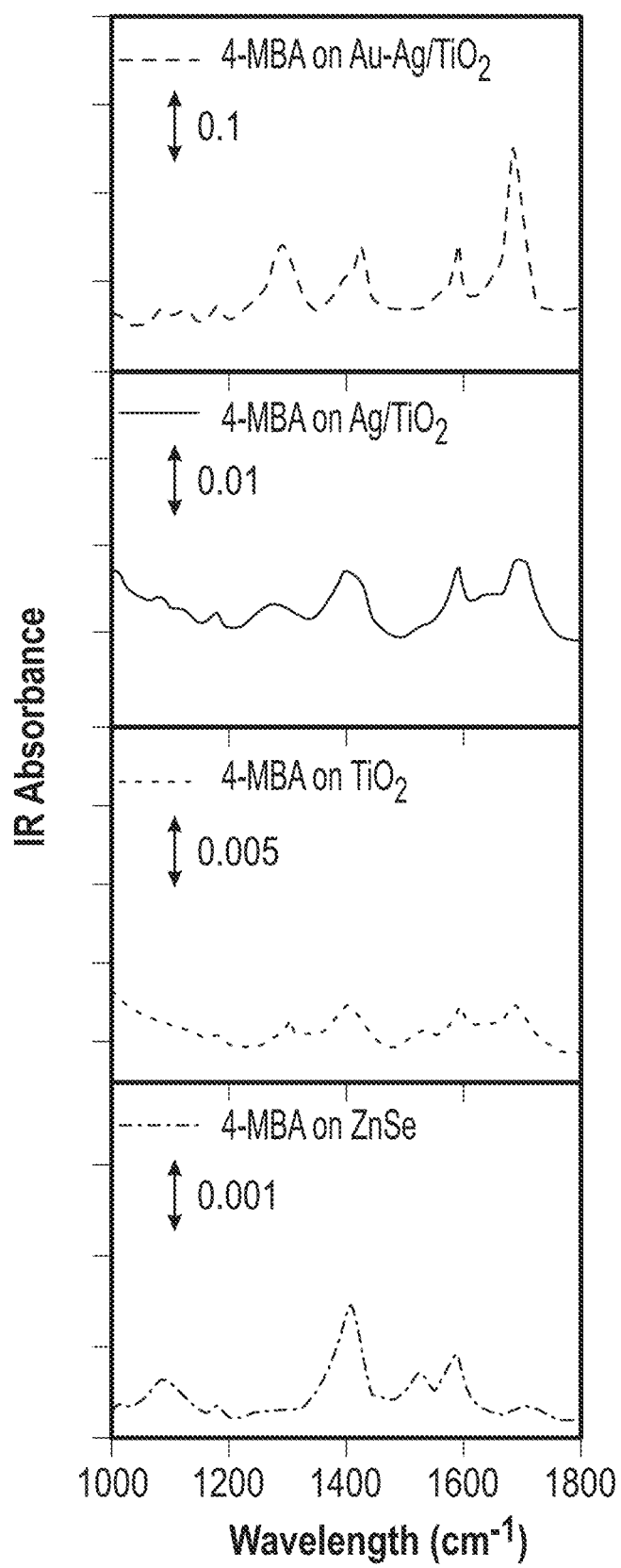
FIG. 4E shows IR spectra of 4-MBA adsorbed on $Au—Ag/TiO_2$, $Ag/TiO_2$ and neat ZnSe prism, the concentration of 4-MBA for SEIRAS from $Au—Ag/TiO_2$ and $Ag/TiO_2$ is 100 mg/L, while the concentration for normal IR from neat ZnSe prism is 1 g/L, The $Au—Ag/TiO_2$ was fabricated at the condition of pH 9 and $10^{-3}$ M $HAuCl_4$, in accordance with various embodiments.

Such background-free signal can be attributed to the fact that the instant deposition technique did not bring any external chemical capping agent. To investigate the performance of the as-prepared substrate for SEIRAS measurement, the 4-mercaptobenzoic acid (4-MBA) was chosen as a model analyte. FIG. 4E displays the SEIRAS spectra of 4-MBA adsorbed on $TiO_2$, Ag/$TiO_2$, and Au—Ag/$TiO_2$ as well as the FTIR spectrum onto neat ZnSe for comparison. The normal FTIR spectrum of 4-MBA was characterized by some characteristic bands at 1087, 1405 and 1584 cm$^{-1}$, which were assigned to the vibration modes of C—C ring-breathing, COO— stretching, and C—C ring-breathing. After adsorbed on $TiO_2$ and metal/$TiO_2$ substrate, the IR signals of 4-MBA was enhanced to different extents. At the same time, the SEIRAS spectra shows many shifts induced by the interaction of 4-MBA with the $TiO_2$ metal. When adsorbed on the Ag—$TiO_2$ substrate, a strong band attributed to C—O at 1288 cm$^{-1}$ appeared and the intensity of band from C=O at 1682 cm$^{-1}$ was also significantly increased. The strong enhancement observed for the two bands can be attributed to the high perpendicular orientation of the COO— towards the metal film. In contrast, the band at 1081 cm$^{-1}$ is not so enhanced, which could be related to the predominant parallel orientation of the aromatic ring. Most interestingly, the inventors noted that the IR signals were most greatly enhanced when 4-MBA was adsorbed on Au—Ag/$TiO_2$. Additionally, the corresponding characteristic absorption of 4-MBA aforementioned shifted to 1081, 1396 and 1589 cm$^{-1}$, respectively. These shifts in frequency was believed to the effect of the existent Au. The greatest enhancement at the peak area from 1604 to 1758 cm$^{-1}$; the enhancement factor from Au—Ag/$TiO_2$ is up to 50, 105 and 3×10$^4$ in comparison with those from Ag/$TiO_2$, $TiO_2$, and neat ZnSe prism, respectively (see details on EF calculation in data analysis). Therefore, it is suspected that the superior SEIRAS activity is attributed to the synergetic contribution of $TiO_2$ and Au—Ag alloy.

Since the $AuCl_4^-$ will be hydrolyzed in water especially in the presence of OH—, the galvanic replacement could be controlled by the pH. In this study, four different pH values (5, 7, 9, 11) were chosen. After the Ag/$TiO_2$ template was reacted with $HAuCl_4$ solution at different pH, a different trend in morphological change was observed. At pH 5, a large number of spherical particles formed homogeneously on the surface of template. As the pH was increased to 7 and 9, the majority of particles appeared rod-shaped but maintained a relatively monodispersion. Accompanying the morphological change, the average dimension of particle was also increased. However, when the template was reacted with $HAuCl_4$ at pH 11, only small number of particles was found in the field of vision. XPS analysis provided complementary picture that with increasing pH the amount of Au on the surface of template was progressively increased and then decreased. Correspondingly, the variation trend of Ag amount was opposite. It is generally accepted that increase of pH from acid to alkaline makes $AuCl_4^-$ more hydrolyzed, forming $AuCl(OH)_x^-$. As a result of hydrolysis, the reduction potential of Au solution would decrease, leading to the weak driving force for the galvanic reaction. In this experiment, the low pH (e.g., high reaction rate) allowed the Au atoms resulting from the galvanic replacement located over the entire surfaces during the initial stage of reaction. Thus, the uniform and small alloying particles were formed.

In contrast, the replacement reaction tended to be initiated locally at high pH (e.g., lower reaction rate), followed by the epitaxial deposition of Au atoms on the surfaces, forming the larger particles. It is noted that whatever the pH, much of the template surface was still occupied by the large amount of Ti element. At pH 7 and 9, the amount of Ti on the surface reached ca. 35 atom %. The pH influence was also visible by the color change of template, which exhibited dark blue (pH 5), purple (pH 7), dark purple (pH 9) and dark green (pH 11), respectively. UV-vis-DRS spectra shows the sharp extinction peak at around 580 nm at pH 5, 7 and 9, while this peak became wider and was accompanied with a slight blue shift at pH 11. It can be induced by the decrease in the surface area of the nanoparticles. This observation supported the results obtained from SEM analysis. The inventors have further performed SEIRAS experiments on Au—Ag/$TiO_2$ substrate adsorbed with 4-MBA for various pH. The enhancement was strongest at pH 9 but weakest at pH 5. In the case of peak area ranging from 1604 to 1758 cm$^{-1}$, the SEIRAS activity at pH 9 is 1.29-, 1.52- and 2.50-fold stronger than those at pH 11, 7 and 5, respectively. Interestingly, the inventors observed a maximum in SEIRAS activity (at pH 9) having the much higher amount of Au and Ti, but a minimum (at pH 5) having the smallest amount of Au and Ti. Accordingly, it is believed that there is a close relationship between the composition of substrate surface (especially the Ti and Au amount) and SEIRAS capacity.

To further investigate the effect of Au deposition as a function of $HAuCl_4$, the inventors evaluated the SEIRAS properties of Ag/$TiO_2$ that had been reacted with different concentrations of $HAuCl_4$ at pH 9. After reaction with 10$^{-5}$ M of $HAuCl_4$, the morphology is very similar to that of Ag/$TiO_2$. With increase of $HAuCl_4$ concentration to 10$^4$ M, the surface became more rough with the more aggregation of particles in the field of vision. When the $HAuCl_4$ concentration was further increased to 10$^{-3}$ and 10$^{-2}$ M, many larger particles were formed on the surface of Ag/$TiO_2$ template. XPS confirmed that with the increase of $HAuCl_4$ concentration the Au amount on Ag/$TiO_2$ surface was greatly increased and then levelled off. Note that the amount of Ti element on the template surface was maintained at a high level at 10$^{-4}$ and 10$^{-3}$ M $HAuCl_4$, but was significantly decreased at 10$^{-2}$ M. The inventors observed the color change from yellow to dark green, and then purple as the $HAuCl_4$ concentration was increased, as shown by insert photographic images. The alloying process could also be conveniently followed using UV-vis-NIR spectroscopic method. It was shown that the LSPR peak of Ag at 420 nm still existed after reaction with 10$^{-5}$ M $HAuCl_4$. When the concentration of $HAuCl_4$ was increased to 10$^{-4}$ M, the peak corresponding to Ag disappeared but a very broad peak was found ranging from 400 to 1200 nm. With more addition of high concentration $HAuCl_4$, the LSPR peak red-shifted to 520 nm, indicating that the optical properties of composite particles were dominated by Au. Such spectral evolution with $HAuCl_4$ concentration was consistent with the previous observation, which can explain the formation of Au—Ag alloy. The SEIRAS activity was greatly dependent on the $HAuCl_4$ concentration. The SEIRAS activity reached a maximum value when the Ag/TiO$_2$ substrate was reacted with 10$^{-3}$ M HAuCl$_4$, which is 1.18-, 1.33- and 2.97-fold stronger than those at concentration of 10$^{-4}$, 10$^{-2}$ and 10$^{-5}$ M, respectively. This observation also suggested that a simple titration of different concentration of HAuCl$_4$ into the as-prepared Ag/TiO$_2$ substrate allowed the inventors to optimize their SEIRAS activity. On the other hand, it was noteworthy that the strongest enhancement was achieved when most of the substrate surface was occupied by Ti elements, similar to the trend with pH.

Although the exact mechanism for SEIRAS is debated, chemical enhancement has been widely accepted to explain SEIRAS phenomena. It is associated with the charge transfer between the energy levels of the chemisorbed molecules and Fermi level of the metals. In this experiment, it was surprising and unexpected to find that the IR signal of adsorbed molecules was progressively enhanced with the sequential deposition of Ag and then Au on TiO$_2$. This strongly demonstrated the synergetic contribution of metals and semiconductor to SERS. Generally, the dominant contribution to enhancement effect of TiO$_2$ is proposed to be associated with the TiO$_2$-to-molecule charge transfer (CT) mechanism, e.g., photon-induced CT (PICT). For Ag/TiO$_2$, the deposited Ag can be excited to produce photogenerated holes and electrons under visible light irradiation. The photogenerated electrons would be injected into the conduction band of TiO$_2$ connecting with Ag and/or subsequently relaxed vibratingly onto the surface-state energy level (E$_{ss}$) of TiO$_2$ and then transferred to the lowest unoccupied molecular orbital (LUMO) of the adsorbates. The additional photogenerated electrons from Ag can take part in the TiO$_2$-to-molecule PICT mechanism. After Au deposition forming Au—Ag alloy, the SEIRAS capacity was considerably increased compared to Ag/TiO$_2$ and pure TiO$_2$. Because the Fermi level for Au (about −5.0 eV) is lower than that for Ag (about −4.6 eV), the Au atoms can induce a strong electronic effect on the Ag atoms by charge transfer, leading to the neighboring Ag atoms more active than those in monometallic Ag nanoparticles. As a result, a large number of photoexcited electrons from Au—Ag was injected into the conduction band of TiO$_2$ after visible light excitation. Additionally, the Fermi level of Au—Ag alloy became closer to that of TiO$_2$, which may be favorable to the transport of photoexcited electrons from Au—Ag alloy to TiO$_2$. It was found that regardless of the effects of pH and HAuCl$_4$ concentration, high SEIRAS enhancement was accompanied with the high amount of Ti and Au atoms on the substrate surface. To the contrary, excessive fraction of surface coverage of Au—Ag alloy (e.g., low surface coverage of Ti) on the substrate did not favor the SEIRAS capacity, as revealed in Au—Ag/TiO$_2$ at 10$^{-2}$ M HAuCl$_4$. This observation strongly confirmed the key role of TiO$_2$. Without intending to be bound to any theory, one possible reason was that the high coverage of Au—Ag alloy on TiO$_2$ surface prevented the light absorption by TiO$_2$, resulting in the low efficiency charge transfer. Thus, the inventors suspect that the superior SEIRAS activity can be ascribed to the synergetic contribution of TiO$_2$ and Au—Ag alloy: TiO$_2$-to-molecule CT is the domain contribution to the SEIRAS capacity so that the substrate surface required the high amount of Ti elements to ensure the large contact area between TiO$_2$ and adsorbates; Au—Ag alloy (especially the high amount of Au) provided a large number of additional electrons that considerably improved the efficiency of the TiO$_2$-to-molecule CT.

FIG. 5A shows the quantitation capacity of SEIRAS membrane. It can be clearly seen that the IR absorbance of 4-MBA progressively increased with the increase of 4-MBA concentration in solution. Note that a sudden significant increase in IR absorbance was observed when concentration was above 20 mg/L. The spectra of curves at concentration 0.01-20 mg/L in the region of 1570-1600 cm$^{-1}$ was zoomed in as shown in FIG. 5B. 4-MBA was quantified based on the peak are in 1570-1596 cm$^{-1}$ as shown in FIG. 5C. The peak area showed a linearity within the wide tested concentration range of 4-MBA. There were two different linear relationships ranging from 0.01-20 mg/L and 30-100 mg/L, with a coefficient of determination (R$^2$) equal to 0.9553 and 0.9635, respectively. The linear behavior of SEIRAS response from the substrate was similar to the observations from Ag and Au nanostructured substrate that surface-enhanced IR absorbance will increase linearly with increasing adsorbed concentration of the analyte.

To demonstrate the universality of the ATR-SEIRAS membrane, two oppositely charged proteins, BSA (pKa of 4.7, negatively charged in neutral pH) and lysozyme (pKa of 11, positively charged in neutral pH) were tested. It was found that the substrate can detect both proteins as low as 1 mg/L in solution, regardless of their charges. In the case of BSA, the amide I, II and III modes can be seen at 1650, 1546 and 1257 cm$^{-1}$, respectively. In lysozyme, the amide I and II bands were detected at 1658 and 1550 cm$^{-1}$. The charge independent detectability of the substrate suggested that protein could chemisorb to the nanostructure surface though covalent interaction between metal (Ag and Au)/TiO$_2$ and cysteine-like moieties of protein. Additionally, the SEIRAS bands of BSA and lysozyme were distinct from each other, which presents a proof of principle that proteins can be differentiated and detected by the SEIRAS membrane. Two representative probes, ferbam and Rhodamine 6G (R6G), which are commonly used as Raman indicators due to their inherent Raman-active structure were also examined. As a complementary effect, these two molecules are weak in IR absorption. Even though the concentration was 1 mg/L, some characteristic bands of ferbam and R6g can be detected. It was worth noting that attachment of analytes to SERS or SEIRAS active substrates can be challenging since the capping agent stabilizing the nanoparticle poses as a barrier for the analytes to directly attach to the nanoparticle surface. In this experiment, the substrate without any capping agent could directly interact with analytes and thereby providing good SEIRAS spectra. These findings demonstrated the universality of the substrate irrespective of their charge and molecular structure in label free method.

An innovated ATR-SEIRAS membrane with bimetal-semiconductor hybrid nanostructures has been developed. The Au—Ag/TiO$_2$ was synthesized on a flexible polymeric membrane (PVDF) by a sequential deposition technique, which did not bring any external chemical capping agent and background signal. The utilization of flexible PVDF membrane as a support base not only integrated SEIRAS with ATR mode but also conferred portability on the substrate, which can be truly effectively and practically applied in the IR instrument for real analytical applications. By tuning the reaction pH and HAuCl$_4$ concentration, the EF of 4-MBA on the Au—Ag/TiO$_2$ reached 3×10$^4$ compared to unenhanced signals from neat crystals. It was also demonstrated that these high sensitive Au—Ag/TiO$_2$ substrates can be used for quantifying adsorbates and sensing ultra-trace amounts of various protein and IR-active compounds. Therefore, the ATR-SEIRAS membrane can be attractive prospects for molecular characterization, detection and bioanalytical application.

Example 3 Au—Ag/TiO$_2$ Substrate

TiO$_2$ suspension was prepared by suspending a weighted amount of TiO$_2$ nanopowders (20 nm) in deionized water. The final concentration of TiO$_2$ was 1 g/L. Prior to use, the stock suspension was vortexed vigorously for 2 min at ambient temperature, and then submitted to a sonication process for 20 min. A novel deposition technique combing deposition-precipitation and simultaneous photodeposition was employed to fabricate Ag—Au/TiO$_2$ substrate. Briefly, one milliliter of TiO$_2$ suspension (1 g/L) was filtered through a Durapore® (made of polyvinylidene difluoride, PVDF) membrane filter (220 nm pore size, 13 mm OD) using a syringe filter holder (Sartorius Stedim Biotech Gmbh, Germany). The filtration was repeated two times. TiO$_2$ would be trapped on the membrane because of the significant aggregation of particles. The TiO$_2$-PVDF membrane was then removed from the filtration apparatus and washed with deionized water. As the first step, gold precursor (Au(III)) was immobilized on TiO$_2$ by deposition-precipitation with urea in the absence of light. Briefly, the TiO$_2$-PVDF membrane was placed in a 12-well plate containing 1 mL of HAuCl$_4$ ($10^{-3}$ M) and 0.6 mL of urea (1 M). The pH of mixture was adjusted to 2 using hydrochloric acid. Then the plate was placed in a dark room for 1 h incubation. After reaction, the as-prepared Au (III)/TiO$_2$ membrane was thoroughly washed with distilled water and transferred to another clean 12-well plate. Then, 2 mL of AgNO$_3$ at different concentrations ($10^{-4}$, $10^{-3}$, $10^{-2}$ and $10^{-1}$ M) was added and the system was irradiated for 40 min by a 40 W mercury lamp with a maximum emission at 254.6 nm. The distance between UV lamp and substrate was kept at 15 cm. The deposition of Ag as well as the reduction of Au precursor on TiO$_2$ surface were triggered via a photoreduction process under UV irradiation. After illumination, the membrane substrate with Ag—Au/TiO$_2$ was washed with distilled water twice and dried at room temperature in the dark.

For comparison, the monometal-semiconductor substrates, e.g., Au/TiO$_2$ and Ag/TiO$_2$ were fabricated through photoreduction. Au/TiO$_2$ substrate was prepared by direct UV irradiation of Au (III)/TiO$_2$ membrane. For Ag/TiO$_2$, the TiO$_2$ membrane was irradiated in 2 mL AgNO$_3$ solution of $10^{-3}$ M. The UV irradiation condition for both Au/TiO$_2$ and Ag/TiO$_2$ was the same to that of Ag—Au/TiO$_2$.

The substrate was vacuum-dried overnight and characterized by scanning electron microscopy (SEM) using a FEI Magellan 400 (FEI, OR) with an accelerating voltage of 5 kV under low vacuum conditions. X-ray photoelectron spectroscopy (XPS) studies were performed on a Physical Electronics Quantum 2000 spectrometer using a monochromatic Al K$\alpha$ excitation at a spot size of 200 µm with pass energy of 46.95 eV at 15° take-off angle. All banding energies were referenced at 284.6 eV, as determined by the location of the peak C 1s spectra, which gave banding energies values within an accuracy of ±0.1 eV. UV-vis-NIR diffuse reflectance spectra (UV-vis-NIR DRS) were recorded on a LAMBDA™ 1050 UV/vis/NIR spectrometer along with 150-mm integrating sphere (PerkinElmer, Inc., Shelton, Conn. USA).

In this example, 4-mercaptobenzoic acid (4-MBA) was chosen as a model analyte to investigate the performance of the as-prepared substrate for SEIRAS detection. The IR samples were prepared as follows: the membrane substrate was soaked in 1 mL 4-MBA solution of different concentrations in a 12 well plate. After 1 h incubation, the substrate was taken out followed by washing with deionized water and air-dried. For reference, 5 µL of pure 4-MBA solution (1 g/L) was directly dropped on the neat ZnSe prism. To evaluate the discriminating ability of Ag—Au/TiO$_2$ substrate, two representative pesticides (thiram and thiabendazole) as well as their mixture were studied. Before measurement, 1 mL of pesticide (1 mg/L) was incubated with substrate in the same way to 4-MBA as described above.

The attenuated total reflectance (ATR)-FTIR spectra were recorded using an IRTracer-100 Shimadzu equipped with a Pike MIRacle ATR accessory and a high pressure clamp. The substrate was placed in direct contact with ATR prism (ZnSe) upon pressure. Four discrete locations on each membrane substrate were randomly chosen and scanned within a spectrum range of 1000-4000 cm$^{-1}$. Each experiment was carried out in triplicate, thus, each spectrum shown in this study was an average of at least 12 individual spectra. Spectral data were collected with IR solution software. All spectra were analyzed using OMINICS software (Thermo Fisher Scientific, Waltham, Mass.). The spectra from different locations in each sample were averaged to get a final spectrum. Data are presented as a mean value with its standard deviation indicated (mean±SD). IR enhancement factor (EF) for the membrane substrate was calculated according to the following equation:

$$SEIRAS\ EF = \frac{I_{SEIRAS}/I_{IRAS}}{C_{SEIRAS}/C_{IRAS}} \times \frac{PVDF\ \text{membrane area}}{IR\ \text{detected area}}$$

Where $I_{SEIRAS}$ and $I_{IRAS}$ represent the SEIRAS peak area ranging from 1604-1758 cm$^{-1}$ of the 100 mg/L 4-MBA on Ag—Au/TiO$_2$ and corresponding IR absorption of 1 g/L 4-MBA on the neat ZnSe prism. $C_{SEIRAS}$ and $C_{IRAS}$ represent the concentration of 4-MBA incubated with Ag—Au/TiO$_2$ and neat prism, respectively. To determine EF value, the inventors assumed that all of the 4-MBA molecules were adsorbed on the substrate surface. Thus, the EF value obtained was an underestimated value, and the real EF value could actually be some orders of magnitude higher.

A two-step method for Ag—Au/TiO$_2$ using a combination of deposition-precipitation and seed-growth method by photodeposition is presented. As the first step, the Au precursor was immobilized on a TiO$_2$-PVDF membrane at pH 2 by deposition-precipitation with urea (DP urea). The DP was based on the interaction between positively charged TiO$_2$ surface and negatively changed Au species such as [AuCl$_4$]$^-$ or [Au(OH)Cl$_3$]$^-$ in solution at acidic pH. The gradual release of hydroxide ions from urea (CO(NH$_2$)$_2$) throughout the whole solution, CO(NH$_2$)$_2$+3H$_2$O→2NH$_4^+$+CO$_2$+2OH$^-$, made possible the slow precipitation of hydroxides and subsequent [Au(OH)Cl$_3$]$^-$ onto the TiO$_2$ support, and avoided a brutal and local increase of pH which could cause precipitation in solution. Thus, the DP urea method permits majority of the Au present in solution was deposited onto the TiO$_2$ surface as an Au (III) precipitate. Moreover, the slow precipitation allowed the distribution of gold precursor homogeneously on TiO$_2$ surface, where these immobilized Au precursors would act as seeds for the growth of Ag—Au alloys. Afterwards, the as-prepared Au (III)/TiO$_2$ template was immersed into the AgNO$_3$ solution. The Au (III) was reduced under UV by photocatalytic reduction of TiO$_2$ and at the same time, Ag (I) was also photoreduced and grown over the Au seeds. The achieved substrate was thoroughly washed with distilled water. For IR measurement, the substrate was immersed into analyte solution for a certain time followed by washing and air dry. Then, the dried substrate was placed in direct contact with ATR crystal.

The substrate during the fabrication process was characterized by SEM, XPS and UV-vis-NIR DRS. SEM images shows that the $TiO_2$ layer formed by 20 nm nanoparticles presented a porous, sponge like network with high roughness and complexity. This nanoscale structure conferred a large contact area between the surface species and substrate, and thus high efficient SEIRAS. The deposition of Au precursor induced a slight aggregation of $TiO_2$ nanoparticles and an increase of the surface roughness. After photoreduction of Ag and Au, some large particles ranging from 60-70 nm homogeneously distributed on the $TiO_2$ surface, suggesting the formation of Ag—Au alloy. It was verified that the deposited gold precursor was trivalent state by XPS measurements, while after photoreduction of $TiO_2$ both gold and silver were metallic, as shown from the peak of Au $4f_{7/2}$ and Ag $3d_{5/2}$ at 83.8 eV and 368.2 eV, respectively. That bare $TiO_2$ exhibited a steep adsorption edge located at 380 nm. After treatment by DP urea, no plasmon band appeared except a shoulder at 400-600 nm. This was consistent with previous observations that gold remained the oxidation state during preparation by DP Urea. After UV irradiation, the extinction spectrum exhibited an absorption shoulder at around 454 nm, close to the surface plasma resonance (SPR) band of Ag. The single SPR peak indicated that the nanostructure was an alloy rather than core-shell nanoparticles, or a mixture of monometallic nanoparticles. The broad absorption in Ag—Au/$TiO_2$ covering 500-1500 nm, can be ascribed to the SPR effect of surface-deposited Ag—Au alloy. The color change was also an indication of the chemical state of gold. The white color of $TiO_2$ changed to orange color, suggesting the oxidation state of gold. Additionally, the gold precursors were distributed on the whole membrane surface consistent with XPS measurements. The substrate further turned to black-green after Ag deposition. Combing with the Ag-like SPR band, allowing for the conclusion that Ag was dominant for the optical properties of Ag—Au/$TiO_2$ nanostructure.

The support base that closely contacts with ATR prism would bring unwanted background signal and hence decrease the sensitivity. Indeed, pure PVDF membrane induced strong IR signal, especially in the fingerprint region from 800 to 1500 $cm^{-1}$. The presence of $TiO_2$ significantly diminished the interference from polymeric membrane, since $TiO_2$ did not have any IR absorption in the mid-infrared range. This surprising observation demonstrated that the $TiO_2$ interlayer not only served as an active substrate for metal growth, but also provided clean IR background for the ease of signal identification. After Au (III) deposition only a small peak was observed at 1625 $cm^{-1}$ due to the presence of OH ($\delta_{OH}$), whereas this peak was also shielded by the following Ag deposition. In addition to the interference from support base itself, the presence of capping agents commonly used to stabilize colloidal nanoparticles can also be a problem to background and substrate sensitivity. In this study, the inventors successfully fabricated the background-free Ag—Au/$TiO_2$ substrate without employing any external chemical capping agent.

The SEIRAS properties of membrane substrate was evaluated using 4-MBA as a model analyte. To investigate the influence of bimetallic Ag—Au, the inventors compare the IR spectra of 4-MBA adsorbed on Ag—Au/$TiO_2$ with those adsorbed on Au/$TiO_2$, Ag/$TiO_2$ and pure $TiO_2$. Both Ag/$TiO_2$ and Au/$TiO_2$ substrates were fabricated by photo-reduction of $TiO_2$ under the identical experiment conditions of Ag—Au/$TiO_2$ preparation, such as the concentration of metal precursor and UV irradiation time. The FTIR spectrum of 4-MBA on neat ZnSe was also shown for comparison. It can be seen that the normal IR spectra of 4-MBA exhibited characteristic peaks at 1087, 1405 and 1584 $cm^{-1}$, which were derived from the vibration modes of C—C ring-breathing, COO— stretching, and C—C ring-breathing, respectively. The SEIRAS spectra displayed many changes induced by the interaction of 4-MBA with the metal/$TiO_2$. Among these changes: (i) the characteristic peaks of 4-MBA aforementioned were shifted to 1081, 1396 and 1589 $cm^{-1}$, respectively, (ii) the appearance of a new intense band at 1288 $cm^{-1}$ derived from C=O, (iii) the band at 1682 $cm^{-1}$ became the strongest. The strong enhancement observed for the latter two bands can be attributed to the high perpendicular orientation of the COO— towards the metal surface. In contrast, the band at 1081 $cm^{-1}$ is not so enhanced, which could be related to the predominant parallel orientation of the aromatic ring. The inventors observed the greatest enhancement from Ag—Au/$TiO_2$, followed by Au/$TiO_2$, Ag/$TiO_2$ and $TiO_2$. According to the peak area of 4-MBA from 1604 to 1758 $cm^{-1}$, the enhancement factor on the Ag—Au/$TiO_2$ substrate was calculated to be approximately $2\times10^4$ compared to unenhanced signals from neat prism, which was also 2.8-, 36-, 144-fold stronger than what was achieved on Au/$TiO_2$, Ag/$TiO_2$ and $TiO_2$ (see details on EF calculation in data analysis). This results strongly indicated the great contribution of Ag—Au alloy to SEIRAS activity.

To further understand the enhancement mechanism, the as-prepared Au (III)/$TiO_2$ template was immersed in different concentrations of $AgNO_3$ followed by UV irradiation. A different trend in morphological change was observed. At $10^{-4}$ M of $AgNO_3$, the substrate surface displayed very similar microstructure to bare $TiO_2$, except the appearance of few large particles. After deposition of Ag at $10^{-3}$ M, a number of sphere-like particles generated and distributed homogeneously on the substrate surface. It appeared that at this concentration more Ag was activated to grow on the Au (III) seeds, forming Ag—Au alloys. Surprisingly, no large particles were observed at high concentrations of $AgNO_3$ ($10^{-2}$ and $10^{-1}$ M). Instead, majority of particles adhered to each other, forming aggregates in the whole vision field. This might be associated with the overgrowth of Ag—Au alloys. XPS measurements revealed that the surface atom percent of Au and Ti on membrane was decreased accompanying the deposition of more Ag. Especially the change of Ti atom was appreciable, the percent was maintained at a high level at $10^{-3}$ M but obviously decreased beyond this point. With increasing $AgNO_3$ concentration from $10^{-3}$ to $10^{-2}$ M, the SPR peak also had a blue-shift from 454 to 428 nm. Correspondingly, the substrate surface turned to be more like Ag color. Note that the substrate at $10^{-3}$ M displayed the strongest and widest absorption band in the visible/infrared light region.

The IR signal of 4-MBA was significantly enhanced with increasing $AgNO_3$ concentration from $10^{-4}$ to $10^{-3}$ M. It was surprisingly found that the signal considerably decreased if further increasing $AgNO_3$ concentrations. It appeared that high amounts of Ag deposition would induce the considerable decrease in IR signal of 4-MBA. These observations suggested that the SEIRAS activity of the Ag—Au/$TiO_2$ substrate can be tuned by simply adjusting $AgNO_3$ concentration under UV irradiation. The SEIRAS activity at $10^{-3}$ M $AgNO_3$ was 3.4-, 2.4-, and 7.7-fold stronger than those at $10^{-4}$, $10^{-2}$ and $10^{-1}$ M, respectively. Such excellent SEIRAS activity at $10^{-3}$ M $AgNO_3$ can be due to the sufficient absorption of vis-NIR light. Furthermore, the substrate surface was mainly occupied by Ti element, which decreased significantly beyond $10^{-3}$ M $AgNO_3$. Previous studies revealed that excessive fraction of Ag around the surface of $TiO_2$ nanoparticles reduced the SERS activity of $Ag/TiO_2$ nanocomposite. The explanation was that the high coverage of Ag prevented the light absorption by $TiO_2$, leading to the low efficiency of charge transfer between $TiO_2$ and adsorbate. Similar phenomenon was also reported for $Au/Ag/TiO_2$ composite nanoparticles in photocatalytic application. Therefore, without intending to be bound to any theory, the inventors believe that the charge transfer between $TiO_2$ and adsorbate also played a key role in the SEIRAS effect of Au—$Ag/TiO_2$. This could be further confirmed by the stronger SEIRAS activity of Ag—$Au/TiO_2$ than those of $Ag/TiO_2$ and $Au/TiO_2$. This was because compared to mono-metal, Ag—Au alloy had the Fermi level closer to that of $TiO_2$, which was thus more efficient to transport photoexcited electrons to $TiO_2$. It was suspect that $TiO_2$-to-molecule CT was the domain contribution to the SEIRAS phenomenon and meanwhile, Au—Ag alloy brought additional enhancement by providing a large number of photogenerated electrons to $TiO_2$.

The IR absorbance of 4-MBA progressively increased as the 4-MBA concentration was increased in solution. There was a cutoff in IR absorbance when concentration was <$4\times10^{-4}$ M. Based on the peak area in 1570-1596 $cm^{-1}$, 4-MBA was quantified. The IR peak areas varied linearly with the 4-MBA concentration in two ranges, e.g., $10^{-6}$-$3\times10^{-4}$ M and $3\times10^{-4}$-$6\times10^{-4}$, with a linearity ($R^2$) of 0.9963 and 0.9638, respectively.

In addition to sensitivity and quantitative capability, one critical factor for the real applications of the substrate is the good signal reproducibility produced from a uniform surface roughness. To evaluate that, the inventors examined 12 random spots from three substrates prepared under identical experimental conditions. As shown, the substrate exhibits high SEIRAS signals reproducibility regardless of the position of measurement spots. The deviation of band intensity of 4-MBA was less than 10% compared to the average relative peak intensity. The high sensitivity and reproducibility allowed them to be potential candidates for sensing complicated systems. There is much interest in the potential environmental impact of pesticides usage in agricultural and their effect on human health. Surface enhanced vibrational spectroscopy technique is a promising method to analyze and detect trace contaminants in food and environment.

Two representative pesticides (thiram and thiabendazole) were investigated and their mixture at trace concentration. Even though the concentration was only $5\times10^{-6}$ M, both of them can be well identified by some characteristic peaks at 1051, 1138, 1239, 1386, 1520, 1648 $cm^{-1}$ for thiram and 1299, 1397, 1441, and 1610 $cm^{-1}$ for thiabendazole. In their mixture, peaks with similar wavelength are partially overlapped at 1228 and 1396 $cm^{-1}$, but the key SEIRAS peaks of individual pesticides can be clearly observed and discriminated. These sensitive, reliable and reproducible ATR-SEIRAS membrane substrate with Ag—$Au/TiO_2$ hybrid nanostructures have great potential to be applied in food safety, environmental monitoring and bioanalysis.

To fabricate Ag—Au alloy on a $TiO_2$-PVDF membrane a two-step method was used. This fabrication technique was based on a combination of deposition-precipitation and seed-growth under photodeposition, which did not bring any background signal. Such bimetal-semiconductor hybrid structure proved to be potential candidate for ATR-SEIRAS sensing. The enhancement factor of 4-MBA can reach $2\times10^4$. The outstanding SEIRAS activity were largely attributed to the charge transfer between substrate and adsorbate enhanced by synergistic effect of Ag—Au alloy and $TiO_2$. Additionally, these substrates displayed high reproducibility and quantitative capacity.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

ADDITIONAL EMBODIMENTS

The following exemplary embodiments are provided, the numbering of which is not to be construed as designating levels of importance:

Embodiment 1 provides a substrate for use in surface enhanced spectroscopy, the substrate comprising:
  a polymeric membrane;
  a semi-conductive coating on the polymeric membrane; and
  a plurality of metallic nanoparticles on the semi-conducive coating.

Embodiment 2 provides the substrate of Embodiment 1, wherein the polymeric membrane comprises one or more polymers.

Embodiment 3 provides the substrate of Embodiment 2, wherein the one or more polymers ranges from about 50 wt % to about 100 wt % of the polymeric membrane.

Embodiment 4 provides the substrate of at least one of Embodiments 2 or 3, wherein the one or more polymers are chosen from polyvinylidene fluoride, polyethylene, polypropylene, polyvinyl chloride, polystyrene, polyamide, polytetrfluoroethylene, thermoplastic polyurethane, cellulose, copolymers thereof, and mixtures thereof.

Embodiment 5 provides the substrate of at least one of Embodiments 2-4, wherein the polymer is polyvinylidene fluoride.

Embodiment 6 provides the substrate of any one of Embodiments 1-5, wherein the membrane is porous and comprises a plurality of pores independently ranging in size from about 100 nm to about 900 nm.

Embodiment 7 provides the substrate of any one of Embodiments 1-6, wherein the semi-conductive coating is applied to about 50% of surface area to about 100% of surface area of a first surface of the polymeric membrane.

Embodiment 8 provides the substrate of any one of Embodiments 1-7, wherein the semi-conductive coating is applied to 100% of surface area of the membrane.

Embodiment 9 provides the substrate of any one of Embodiments 1-8, wherein the semi-conductive coating comprises a metal oxide material configured to transfer one or more electrons to at least one of the metallic nanoparticles upon exposure of the material to at least one of visible light or infrared radiation.

Embodiment 10 provides the substrate of Embodiment 9, wherein the material ranges from about 50 wt % to about 100 wt % of the semi-conductive coating.

Embodiment 11 provides the substrate of any one of Embodiments 9 or Embodiment 10, wherein the material is chosen from $TiO_2$, $Cu_2O$, $CuO$, $Bi_2O_3$, $SnO_2$, $SnS_2$, $ZnO$, mixtures thereof, and combinations thereof.

Embodiment 12 provides the substrate of any one of Embodiments 9-11, wherein the material is $TiO_2$.

Embodiment 13 provides the substrate of any one of Embodiments 1-12, wherein the plurality of semi-conductive nanoparticles is applied to about 50% surface area to about 100% surface area of the semi-conductive coating.

Embodiment 14 provides the substrate of any one of Embodiments 1-13, wherein individual nanoparticles of the plurality of metallic nanoparticles are chosen from $Ag_2O$, elemental silver, elemental gold, elemental copper, elemental platinum, mixtures thereof, alloys thereof, and combinations thereof.

Embodiment 15 provides the substrate of Embodiment 14, wherein the plurality of metallic nanoparticles are $Ag_2O$ nanoparticles.

Embodiment 16 provides the substrate of any one of Embodiments 14 or 15, wherein the plurality of metallic nanoparticles are a mixture of elemental silver nanoparticles and elemental gold nanoparticles.

Embodiment 17 provides the substrate of Embodiment 16, wherein the elemental silver nanoparticles range from about 10 wt % to about 95 wt % of the plurality of metallic nanoparticles.

Embodiment 18 provides the substrate of Embodiment 16, wherein the elemental gold nanoparticles range from about 10 wt % to about 95 wt % of the plurality of metallic nanoparticles.

Embodiment 19 provides the substrate of Embodiment 16, wherein the elemental silver nanoparticles and the elemental gold nanoparticles are each about 50 wt % of the plurality of metallic nanoparticles.

Embodiment 20 provides the substrate of any one of Embodiments 14-19, wherein the plurality of metallic nanoparticles comprise an alloy comprising elemental silver and elemental gold.

Embodiment 21 provides the substrate of Embodiment 20, wherein the elemental silver range from about 10 wt % to about 95 wt % of the alloy.

Embodiment 22 provides the substrate of Embodiment 20, wherein the elemental gold range from about 10 wt % to about 95 wt % of the alloy.

Embodiment 23 provides the substrate of Embodiment 20, wherein the elemental silver nanoparticles and the elemental gold nanoparticles are each about 50 wt % of the alloy.

Embodiment 24 provides the substrate of any one of Embodiments 1-23, wherein at least one of the metallic nanoparticles comprise a surface coating.

Embodiment 25 provides the substrate of Embodiment 24, wherein the surface coating is on about 5% of surface area to about 100% of surface area of the at least one metallic nanoparticle.

Embodiment 26 provides the substrate of any one of Embodiments 24 or 25, wherein the surface coating is chosen from an antibody, an analyte specific targeting group, a compound having an end group, and combinations thereof, wherein the compound having an end group comprises at least one of a nucleophilic end group, electrophilic end group, a hydrophobic end group, and a hydrophilic end group.

Embodiment 27 provides a method of making the substrate of any one of Embodiments 1-26, the method comprising:

filtering the polymeric membrane in a suspension of a semi-conductive coating precursor to form the semi-conductive coating on the polymeric membrane;

immersing the polymeric membrane having the semi-conductive coating thereon in a solution comprising metal ions; and irradiating the polymeric membrane having the semi-conductive coating thereon to form the metallic nanoparticles on the membrane and form the substrate.

Embodiment 28 provides the method of Embodiment 27, wherein the polymeric membrane is irradiated with ultraviolet light.

Embodiment 29 provides a method of acquiring a spectrum, the method comprising:

placing the substrate of any one of Embodiments 1-27 or formed by the method of Embodiment 28 into at least one of a surface enhanced Raman spectroscopy machine and a surface enhanced infrared spectroscopy machine;

contacting the substrate with a solution containing an analyte with; and acquiring a corresponding surface enhanced Raman spectrum or surface enhanced infrared spectrum of the analyte contacted with the substrate.

Embodiment 30 provides the method according to Embodiment 29, wherein the machine is configured to selectively perform both surface enhanced Raman spectroscopy and surface enhanced infrared spectroscopy.

Embodiment 31 provides the method according to any one of Embodiments 29 or 30, wherein the at least one analyte interacts with at least one of the metallic nanoparticles.

Embodiment 32 provides the method according to Embodiment 31, wherein the at least one analyte interacts with at least one of the metallic nanoparticle through a covalent bond, an ionic bond, a van der Waals force, a hydrogen bond, a mechanical connection, or a combination thereof.

Embodiment 33 provides a substrate for use in at least one of surface enhanced Raman spectroscopy and surface enhanced infrared spectroscopy, the substrate comprising:

a membrane comprising polyvinylidene fluoride;

a coating comprising $TiO_2$ on about 100% surface area of a first surface of the membrane; and at least one of a plurality of $Ag_2O$ nanoparticles, a first plurality of elemental silver nanoparticles and a second plurality of elemental gold nanoparticles, and an alloy comprising elemental silver nanoparticles and elemental gold nanoparticles on the $TiO_2$ coating.

What is claimed is:

1. A substrate for use in surface enhanced Raman spectroscopy and surface enhanced infrared absorption spectroscopy, the substrate comprising:
   a flexible polymeric membrane comprising one or more polymers that are insoluble in water;
   a plurality of metal oxide nanoparticles disposed on 50% to 100% of the surface area of a first surface of the polymeric membrane; and
   a plurality of metallic nanoparticles directly disposed on a portion of the plurality of metallic nanoparticles together forming an external surface of the substrate, wherein
   the plurality of metal oxide nanoparticles are configured to work synergistically with metal nanoparticles upon exposure of the substrate surface to at least one of visible light or infrared radiation.

2. The substrate of claim 1, wherein the one or more polymers range from about 50 wt % to about 100 wt % of the polymeric membrane.

3. The substrate of claim 2, wherein the one or more polymers are chosen from polyvinylidene fluoride, polyethylene, polypropylene, polyvinyl chloride, polystyrene, polyamide, polytetrafluoroethylene, thermoplastic polyurethane, cellulose, copolymers thereof, and mixtures thereof.

4. The substrate of claim 3, wherein the polymer is polyvinylidene fluoride.

5. The substrate of claim 1, wherein the membrane is porous and comprises a plurality of pores independently ranging in size from about 100 nm to about 900 nm.

6. The substrate of claim 1, wherein the plurality of nanoparticle covers about 80% of surface area to about 100% of surface area of a first surface of the polymeric membrane.

7. The substrate of claim 1, wherein the plurality of metal oxide nanoparticles are configured to transfer one or more electrons to at least one of the metallic nanoparticles upon exposure of the plurality of metal oxide nanoparticles to at least one of visible light or infrared radiation.

8. The substrate of claim 7, wherein the plurality of metal oxide nanoparticles comprise $TiO_2$, $Cu_2O$, $CuO$, $Bi_2O_3$, $SnO_2$, $SnS_2$, $ZnO$, mixtures thereof, or combinations thereof.

9. The substrate of claim 1, wherein individual nanoparticles of the plurality of metallic nanoparticles comprise $Ag_2O$, elemental silver, elemental gold, elemental copper, elemental platinum, mixtures thereof, alloys thereof, or combinations thereof.

10. The substrate of claim 9, wherein the plurality of metallic nanoparticles are a mixture of elemental silver nanoparticles and elemental gold nanoparticles.

11. The substrate of claim 1, wherein at least one of the metallic nanoparticles comprise a surface coating.

12. The substrate of claim 11, wherein the surface coating is on about 5% of surface area to about 100% of surface area of the at least one metallic nanoparticle.

13. The substrate of claim 11, wherein the surface coating comprises an antibody, an analyte specific targeting group, a compound having an end group, or a combination thereof, wherein the compound having an end group comprises at least one of a nucleophilic end group, electrophilic end group, a hydrophobic end group, a hydrophilic end group, or a combination thereof.

14. A substrate for use in both surface enhanced Raman spectroscopy and surface enhanced infrared spectroscopy, the substrate comprising:
   a flexible porous water insoluble membrane comprising polyvinylidene fluoride;
   a coating comprising $TiO_2$ nanoparticles disposed on 50% to 100% of the surface area of a first surface of the membrane; and
   at least one of
      a plurality of $Ag_2O$ nanoparticles directly disposed on a portion of the coating comprising $TiO_2$ nanoparticles,
      a first plurality of elemental silver nanoparticles and a second plurality of elemental gold nanoparticles directly disposed on a portion of the coating comprising $TiO_2$ nanoparticles, and
      an alloy comprising elemental silver nanoparticles and elemental gold nanoparticles directly disposed on a portion of the coating comprising $TiO_2$ nanoparticles.

* * * * *